United States Patent [19]

Ebel et al.

[11] Patent Number: 5,717,781
[45] Date of Patent: Feb. 10, 1998

[54] OPHTHALMIC LENS INSPECTION METHOD AND APPARATUS

[75] Inventors: James A. Ebel, Jacksonville, Fla.; Peter Sites, Knoxville, Tenn.

[73] Assignee: Johnson & Johnson Vision Products, Inc., Jacksonville, Fla.

[21] Appl. No.: 598,068

[22] Filed: Feb. 7, 1996

Related U.S. Application Data

[63] Continuation of Ser. No. 381,668, Jan. 30, 1995, abandoned, which is a continuation of Ser. No. 993,756, Dec. 21, 1992, abandoned.

[51] Int. Cl.$^6$ ............................................. G06K 9/00
[52] U.S. Cl. ..................... 382/141; 382/142; 348/127; 356/124
[58] Field of Search ............................. 382/141, 142, 382/143; 348/86, 127, 131; 356/124; 364/473

[56] References Cited

U.S. PATENT DOCUMENTS

| | | | |
|---|---|---|---|
| 4,598,420 | 7/1986 | Harvey | 382/8 |
| 4,798,460 | 1/1989 | Buffington et al. | 356/124 |
| 4,817,166 | 3/1989 | Gonzalez et al. | 382/1 |
| 4,817,184 | 3/1989 | Thomason et al. | 382/8 |
| 5,007,734 | 4/1991 | Wilms | 356/124 |
| 5,066,120 | 11/1991 | Bertrand | 356/124 |
| 5,080,839 | 1/1992 | Kindt-Larsen | 264/2.6 |
| 5,081,685 | 1/1992 | Jones, III et al. | 382/1 |
| 5,094,609 | 3/1992 | Kindt-Larsen | 425/445 |
| 5,100,232 | 3/1992 | Smith et al. | 356/124 |
| 5,173,739 | 12/1992 | Kurachi et al. | 356/124 |
| 5,268,735 | 12/1993 | Hayashi | 348/131 |

FOREIGN PATENT DOCUMENTS

| | | |
|---|---|---|
| 2057832 | 6/1992 | Canada . |
| 0063761 | 11/1982 | European Pat. Off. . |
| 79 19148 | 3/1980 | France . |
| 34 32 002 C2 | 11/1987 | Germany . |
| 2-257007 | 10/1990 | Japan . |
| 4305144 | 10/1992 | Japan . |
| 2171812 | 8/1988 | United Kingdom . |

*Primary Examiner*—Leo Boudreau
*Assistant Examiner*—Chris Kelley

[57] ABSTRACT

Disclosed is an ophthalmic lens inspection method and apparatus comprising a camera to capture an image of an ophthalmic lens which has been illuminated by a light source. Location and intensity at each camera pixel is converted to an electrical quantity which is then transferred and stored in a memory. A computer containing instructions for comparing the intensity and location values of the pixels starts near the center of the receptor field and continues toward the edge of the field until an intensity deviation is encountered. By evaluating the pixels containing intensity variation, an outline of the lens edge is attained. An annulus is generated enclosing the actual lens edge. All the pixels are changed from an absolute intensity value to a gradient value, represented by two transition edges. Feature extraction is performed to locate defective pixels and place them into groups. Once the groups have been determined each is given a score based on the number, type and severity of the defective pixels placed into that group. From that, a weighted score can be given to the entire lens and the lens either passes or fails.

44 Claims, 13 Drawing Sheets

CALCULATED CIRCLE CENTERS AND RADII

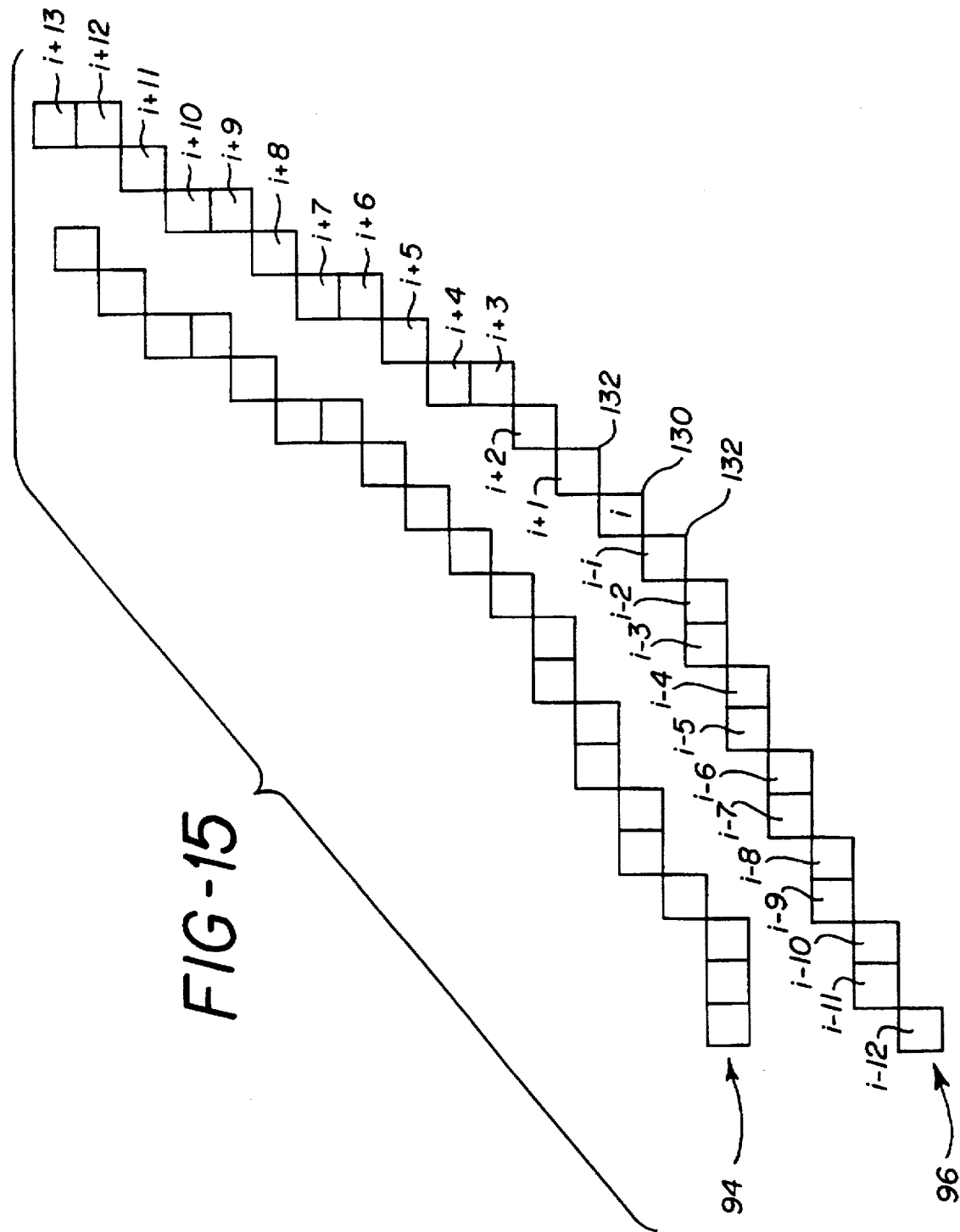

OPHTHALMIC LENS INSPECTION METHOD AND APPARATUS

This is a continuation, of application Ser. No. 08/381,668, filed Jan. 30, 1995, now abandoned, which is a continuation, of application Ser. No. 07/993,756, filed Dec. 21, 1992 now abandoned.

BACKGROUND OF THE INVENTION

This invention relates to a method and apparatus for the automated inspection of ophthalmic lenses and, in particular, ophthalmic lenses such as hydrogel contact lenses whose structure is comprised of a substantial portion of water, although the method is also suitable for the inspection of other small high precision ophthalmic lenses such as intraocular lenses.

Because of the critical nature of ophthalmic lenses (those used on or in the human eye to correct vision) it is of extreme importance and a high priority in the ophthalmic lens industry that such lenses are inspected to be certain that they meet their required characteristics. These requirements extend not only to the optical properties of the lens, that is the optical power, but also the physical characteristics such as dimension, curvature, edge integrity and freedom from bubbles, inclusions and other defects.

Heretofore the most reliable method for inspecting such lenses has been to have a human inspector view each of the lenses under magnification in order to verify that the lens meets each of its required characteristics. As the ophthalmic lens industry has grown, however, such inspection has imposed a large manpower and financial burden on the industry and requires a tedious task on the part of the inspector. Particularly with regard to contact lenses that are provided for periodic frequent replacement the number of lenses that need to be produced and, therefore, inspected increases dramatically.

A problem associated with the inspection of ophthalmic lenses is that the lens itself is optically transparent and therefore does not show the usual light and dark features that are found in the inspection of more routine objects.

Current human conducted inspection methods employ the schlieren method of dark field illumination well known in the art, particularly for the study of transparent fluid flow and optical component inspection. In this method, light from a point source is collimated by a lens which then passes through the medium (i.e. lens) under study. The light is then focused by a second lens directly onto a knife edge. Any light deflected by a refractive non-uniformity in the lens (albeit transparent) is not focused at the knife edge. Light thus deflected from interruption by the knife edge is then projected onto a screen by an object lens and a light spot thus occurs on the an otherwise dark projection screen corresponding to the non-uniformity.

Another problem peculiar to the inspection of ophthalmic lenses is whereas the size of the lens may be allowed to vary from a nominal dimension by a certain amount, the size of acceptable defects such as nicks in the edge or bubbles in the center are unacceptable even when they are two orders of magnitude less than the nominal dimension variation that is permitted. The normal methods of automated inspection, where a stencil or template is placed on the image to be inspected and then compared to the image, is not appropriate for the inspection of ophthalmic lenses because the defects for which the inspection is searching may be a factor of one hundred smaller than an allowable variation in the nominal dimension of the lens.

It is an object of the present invention, therefore, to provide a method and apparatus for the high speed automated inspection of ophthalmic lenses having a degree of accuracy on the order of that provided by human inspection under magnification.

It is a further object of the present invention to accomplish the above inspection using readily available video equipment, electronic components and computing systems.

It is another object of the present invention to be able to determine if a lens is missing from the production line.

Another object of the present invention is to concentrate image analysis on that portion of the lens most susceptible to production defects.

Another object of the present invention is to analyze lens features that are found on the lens prior to locating the lens edge and determine whether such a feature represents a flaw that makes the lens defective.

Another object of the present invention is to bridge any discontinuities found on the lens edge so that minor lens defects and image processing drop-outs do not render the inspection process for a particular lens useless, thereby resulting in the rejection of the good lens.

Another object of the invention is to categorize feature deviations according to category in order to catalogue the types of defects found in lenses thereby providing information on the manufacturing process.

SUMMARY OF THE INVENTION

These and other objectives are obtained by having an electronic camera capture an image of an ophthalmic lens which has been illuminated by a light source. The image is incident upon the receptor portion of a camera; this receptor consisting of a plurality of pixels. The location of, and light intensity incident upon, each pixel is converted to an electrical quantity which is then transferred and stored in a memory. A computer is operably connected to the memory and capable of retrieving both the location and intensity values stored therein. The computer contains instructions for comparing the intensity and location values of the pixels.

In the preferred embodiment, this comparison comprises starting at a pixel near the center of the receptor field and continuing toward the edge of the pixel field until an intensity deviation is encountered. By evaluating the pixels surrounding the center pixel containing the intensity variation, finding the closest match to that pixel, then repeating the procedure, an outline of the features is attained. If the characteristics of that feature do not correspond to a lens edge, the feature is evaluated to determine whether the lens should be rejected. If the feature does correspond to the lens edge, the characteristics of that edge are evaluated to determine whether the edge and thereby the lens is acceptable.

In the preferred embodiment, this is accomplished by tracking around the edge location until approximately 30 data points at 12° intervals are found. Three simultaneous equations are then solved for ten groups of 3 points to find the average center of the lens and the average radius. From this, an annulus is generated using the center and radius data. The boundaries of this annulus enclose the actual lens edge. Within this annulus, all the pixels are changed from an absolute intensity value to a gradient value allowing the lens edge to be represented by two transition edges, one from the inner and one from the outer side of the contact lens edge. These two edges are then thinned so that only the maximum intensity pixels along the edge remain. The lens edges are then transformed from an XY domain to a polar domain, retaining values for radius, angle and intensity gradient. Feature extraction is then performed on these two data matrices. This feature extraction involves a search for Radial Deviation, Localized Gradient Deviation, Spatial Derivative, DIP Localized Gradient Deviation, One Tail Localized Gradient Deviation and Discontinuity. After making these pixel level determinations, each defective pixel is considered for membership in a defect group. After grouping both the inner and outer contours of the lens edge separately, those groups which overlap on both sides of the lens edge in one region of the lens fall into combination defect groups. Once the groups have been determined each group is given a score based on the number, type and severity of the defective pixels placed into that group. From that, a weighted score can be given to the entire lens and based upon this score the lens either passes or fails the inspection.

DESCRIPTION OF THE DRAWINGS

FIG. 14 is a representation of the lens edge radial deviation evaluation performed using pixel processing wherein

FIG. 15 shows the relationship of the pixel-of-interest and its neighbor for a gradient.

DESCRIPTION OF THE PREFERRED EMBODIMENT

Figure 1:
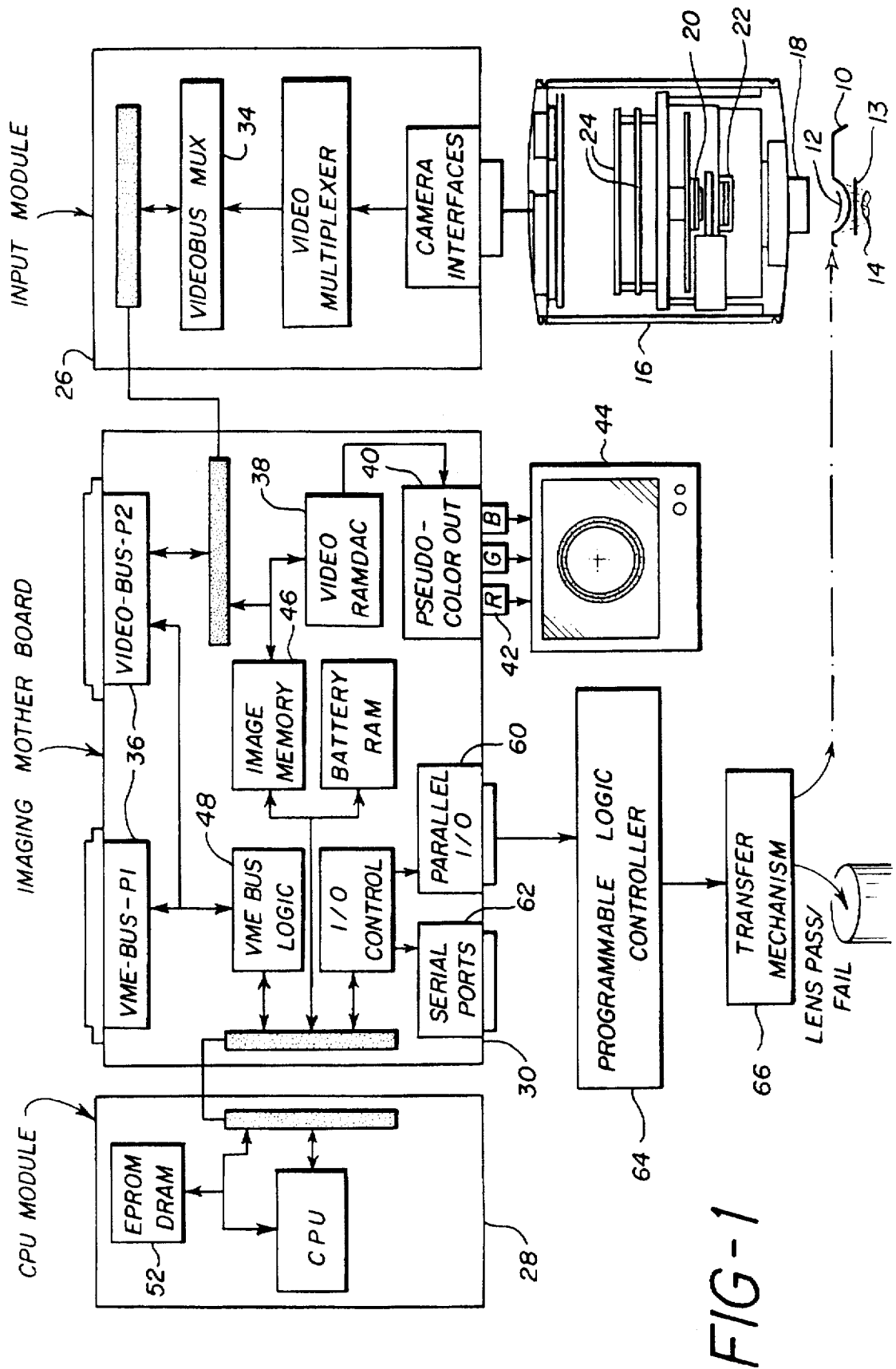
FIG. 1 is a block diagram showing the physical components associated with the present invention, the manner in which they are connected as well as the light source and the lens to be inspected.

Implementation of the present invention is not specific to any particular hardware system and may in fact be implemented by a number of software schemes. As a specific best mode example, however, the following is given.

Referring to FIG. 1a, the system of the present invention consists of a structure (not shown) which holds a contact lens package 10 which contains a contact lens 12 in deionized water above a light source 14 and below camera 16.

A more detailed description of the preferred embodiment of the lens package is given in copending U.S. application Ser. No. 07/995,607 now abandoned filed concurrently with this application.

The camera 16 is a high resolution solid state camera such as the Videk MegaPlus® camera made by Kodak of Rochester, N.Y.

This camera comprises a lens 18, and in this embodiment has the lens fixed on a 14.5 millimeter field of view. The camera was fitted with a Nikkor 55 millimeter standard lens. The lens was set at f/2.8 then attached to an Andover band pass filter centered at a wavelength of 550 nm with a 10 nm full wave half height (FWHH) to the end of the camera lens. Such a filter removes chromatic aberrations thereby improving overall spatial resolution and maintains a photopic response to the lens inspection similar to a human inspector's ocular response. This filter 22 also removes infrared at the CCD detector which would decrease the overall system modulation transfer function (MTF).

Below the package containing the lens in deionized water is an optical diffuser 13 made of flashed opal and below that a light source such as a strobe light 14. The strobe lamp is capable of firing a 5 Joule, 10 microsecond pulse of light which is initiated by the image processing system. Typically a 450 millisecond recovery time is needed for the strobe to recharge between firings.

A more detailed description of the preferred embodiment of the illuminating system is given in copending U.S. application Ser. No. 07/994,388 now abandoned filed concurrently with this application.

The camera 16 is focused by a precise lead screw drive which moves the camera up and down the frame to which it is attached. Once the camera is focused it remains stationary when performing the inspection procedure.

The camera further comprises a charged coupled device (CCD) sensor which serves as a light receptor. This CCD receptor consists of a matrix of pixels in a rectangular array, 1,320×1,035.

The receptor charge couple device sensor of the camera converts light intensity to an electrical signal. This analog electrical signal is then converted by circuitry 24 from an analog to a digital video output signal containing 256 gray levels by means of an 8 bit analog to digital (A/D) converter.

the camera is operated in an asynchronous fashion using a signal generated by the lens and package moving into the proper location to trigger both the firing of the strobe and subsequent transfer of the image.

A more detailed description of the preferred embodiment of the lens transport system and pallet system with illumination triggering are given in copending U.S. applications Ser. No. 07/994,249 and Ser. No. 07/994,242 both abandoned filed concurrently with this application.

The image is transferred via circuits in the camera 24 to the input module 26 of the image processing system. The image processing system is comprised of three parts, the input module 26, the CPU module 28 and the imaging motherboard 30.

The digital signal in input module 26 is processed to ensure that each line has a corresponding video sync signal. The corrected digital signal is then provided to a video multiplexer 34 which transfer the digitized signal to the CPU module 28.

This set of data representing one video frame (or with the particularly described camera 1,048,576 pixels) is made available to video buses 36 which allow transfer to other processing hardware. The image is also displayed using video RAMDAC 38 which can then be converted to a pseudo color output by convertor 40 and transferred through RGB output 42 to a video monitor 44 where an image can be displayed. The RGB pseudo video color output is provided by three look-up tables (LUTs).

The input to the CPU module 28 is in the third instance transferred to an approximately 1 megabyte image memory 46. The data stored in the image memory 46 is transferred to processing units 48 in an orderly fashion by an image timing control.

Processing of the data is performed by a Motorola 68040 CPU.

Required image processing code is stored in the erasable, programmable, read only memory EPROM 52. Results of the processed image are then provided to imaging mother board 30 for appropriate output control. Output can be made either through 16 bit digital parallel input/outputs 60 or through an RS 232 or RS 422 serial ports 62.

The accept/reject decision made by the processor is communicated to transfer mechanism 66 which then disposes of lens 12 either to be further processed by package and sterilization or to be destroyed as a failed lens.

Figure 2:
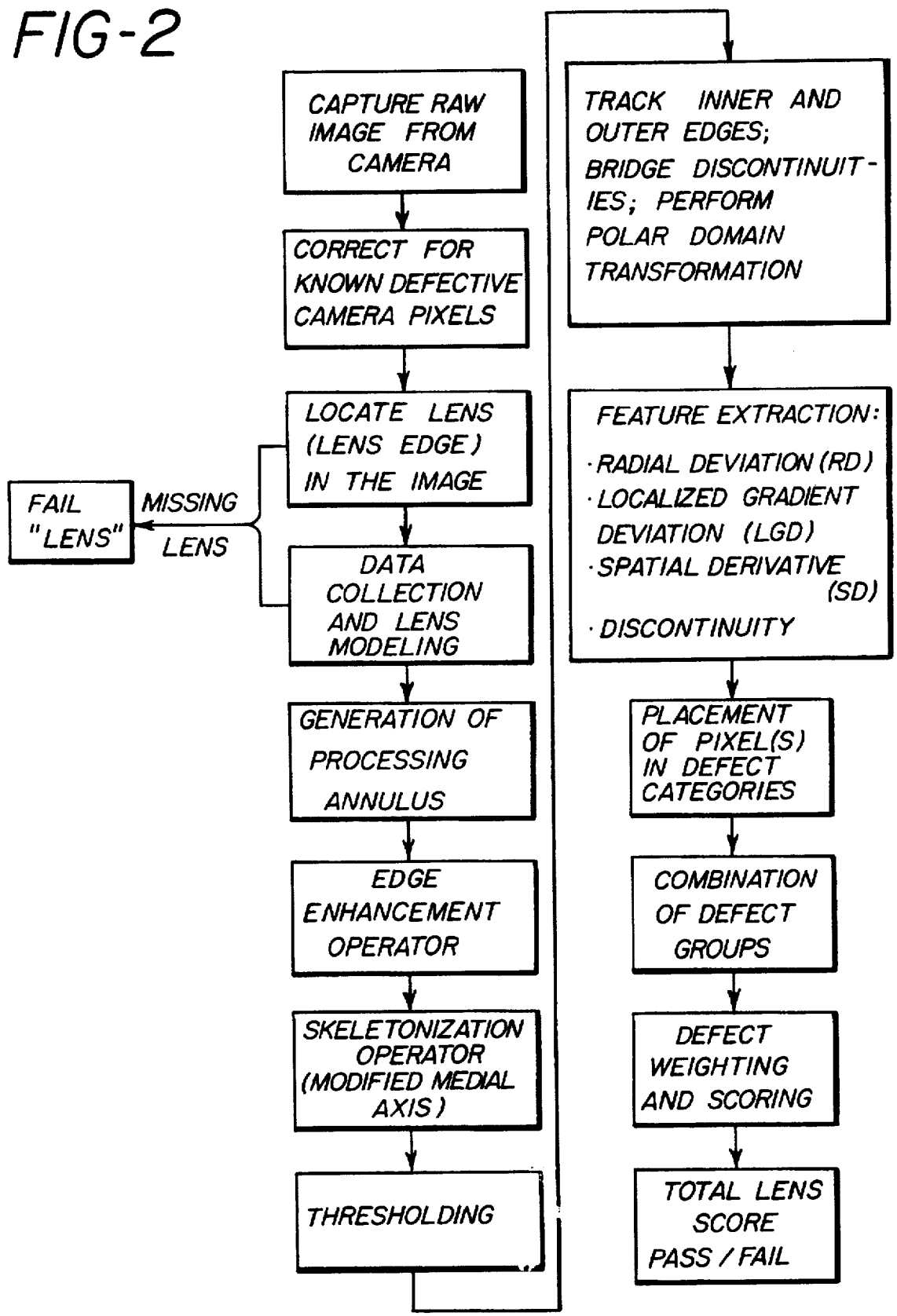
FIG. 2 is a flow chart block diagram showing the steps performed by the apparatus of the present invention in order to image the lens and process that image to determine lens acceptability.

Referring now to FIG. 2, the inspection procedure implemented by the apparatus shown in FIG. 1 is given in block diagram form, and shows in greater detail inspection algorithm conducted by CPU Module 28.

In the first step, a raw image is captured from the camera and provided to the image processing system. That image, which is converted to a stream of digital data, contains an algorithm to correct for known defective pixels in the camera.

The price of a high resolution camera is dependent upon the number of defective pixels allowed in the CCD sensor receptor 20. These comprise primarily pixel elements whose response to light varies 10% or more from its neighboring pixels and clusters of such elements in groups of five or fewer.

Because the number of defective pixels even in the least expensive class of camera is limited and the number of such pixels clustered together is limited, an inexpensive camera may still be used for lens inspection.

The CCD sensor used in the Videk MegaPlus Camera contains a number of column type defects. These defects are usually restricted to a single column and can extend from several pixels long to 50 or more pixels long. These defective regions cause pixel gray levels to be higher or lower than neighboring pixels regardless of the scene being imaged. If these defects occur on or near the lens edge they can mistakenly cause the software to interpret them as defects or discontinuities in the lens.

Defective regions are determined by manually viewing an image of a uniform target for regions where gray levels values deviate unexpectedly. Since defects are restricted to a single column, interpolating between adjacent columns provides an adequate correction. Interpolation for column type defects turns out to be the average of the gray level values from the columns on either side of the defect. The sensor of the camera used may also potentially contain cluster type defects that take the shape of circular blobs. These type of defects can be accommodated either by keeping them in a region that would not interfere with image processing or using the same interpolation technique as described above.

After the above correction is made for known defective camera pixels, the lens is located in the image field by identifying the lens edge. After an attempt is made to locate the lens edge, a decision is made whether the lens is in fact in the container or whether the container is missing a lens. If the container is missing a lens, it is considered a failed lens so that an empty package is not processed and sent to the consumer.

After it has been established that a lens edge is present, data is collected regarding the location of points around the lens edge. This data is used to establish a number of edge triplets which define a circle and a circle center point. The center with the greatest distance from the average center is discarded in order to eliminate the specious data.

At this point specific edge information has not been gathered other than the edge triplets used to define the location of the edge and the lens center.

In order to actually inspect the edge, the calculated center points are used to generate a processing annulus which contains the actual contact lens therein. This allows further detailed data processing to be concentrated in only the annulus containing the edge of interest.

In order to distinguish the lens edge from the background, an edge enhancement operator is then applied to the pixels in the processing annulus. This edge enhancement results in two lens transition edges. One from the interior of the lens to the edge, and the second from outside the lens into the edge.

Although only edge information remains at this point, the two edges (which are actually edge transitions) are still somewhat blurred with an intensity gradient going into and exiting from the edge. In order to more clearly define these transition edges, a modified skeletonization operation is performed on the edge data contained in the processing annulus. Gray level information is retained by the skeletonization operator because it contains information useful in feature extraction.

The next process undertaken in the algorithm is the application of a thresholding operator which eliminates gray level information beyond that useful in feature extraction.

The next step performed by the algorithm is to track the inner and outer edges in order to extract lens edge features. This tracking is begun in a fashion similar to the initial location of a lens edge; it differs however in that gray level criteria are used to locate the lens edge in searching from the inner boundary of the processing annulus outward. When a pixel meeting the gray level threshold criteria is encountered, a series of adjoining pixels are traced to determine whether it is the lens edge. If so, the lens edge is followed around the entire edge and the locations and the corresponding pixel intensity gradients are stored.

The rectangular coordinate information is then converted to radius and angular placement values in the polar domain and associated with the intensity gradient value associated therewith. In order to appropriately process the data and not falsely reject good lenses, discontinuities below a certain number of pixels will be bridged.

With the information now available in polar coordinates, five types of feature extraction are performed. The first is the determination of Radial Deviations (RD) from an ideal inner and outer lens edges. The next is Localized Gradient Deviations (LGD) which considers the gradient of the intensity value in each pixel with respect to those of its neighbors. Then the Spatial Derivative (SD) feature extraction is performed. Spatial Derivative measures the change in radius verses the change is angular displacement. In contrast to the Radial Deviation extraction, Spatial Derivative extraction looks primarily at sharp or sudden changes in edge radius verses the change in angular displacement.

Three final feature extractions are performed. The discontinuity defect is the result of a discontinuity being so large in either the inner or outer lens edges so as to not be deemed correctable by the algorithm that bridges these discontinuities.

Similar to the Localized Gradient Deviation feature, Dip Localized Gradient Deviation (DLGD) looks at the amount of deviation in the pixel-of-interest's gradient value from the average of its localized neighbors. The difference is that more neighbors are used and there is a larger gap of unused pixels around the pixel-of-interest. DLGD is designed to only be sensitive to gradient deviations that are less than their neighbors, hence the name "Dip".

The DLGD feature specifically identifies small edge chips, not identifiable by other features. A pixel classified as defective based on DLGD has the amount of the deviation stored as an indication of severity.

The One Tail Localized Gradient Deviation (ALGD) uses neighboring pixels to calculate deviations taken from a single side of the pixel-of-interest. Twenty pixels before the pixel-of-interest are used to determine the neighborhood average, excluding the four pixels immediately before the pixel-of-interest. ALGD looks at both negative and positive gradient deviations.

While the above feature extraction processes are taking place, numerical scores are signed to each of the identified features derived in proportion to the severity of defect. In addition, defects are placed into groups by looking at aberrant pixels on both the inner and outer edges to determine if they are part of a larger defect to be placed into a defect group. These groups are then evaluated to see if they should be combined with each other to form larger groups, and if inner and outer defect groups should, when combined, be considered as a single defect.

Finally, each defect or defect group is given a score depending on severity, and each type of defect is weighted according to the impact it has on the quality of the lens.

These numerical results of all the defects are then added together to provide a single number, which then determines whether the lens is acceptable or must be discarded.

In addition, the quantitative information derived from the waiting and scoring process can be listed or displayed to give a statistical quality analysis of the lenses being produced and thereby guide those controlling the manufacturing process to identify any deviant process parameters as well as to evaluate the impact of changes on the manufacturing process.

The steps performed in the above algorithm will now be described in detail.

Figure 3:
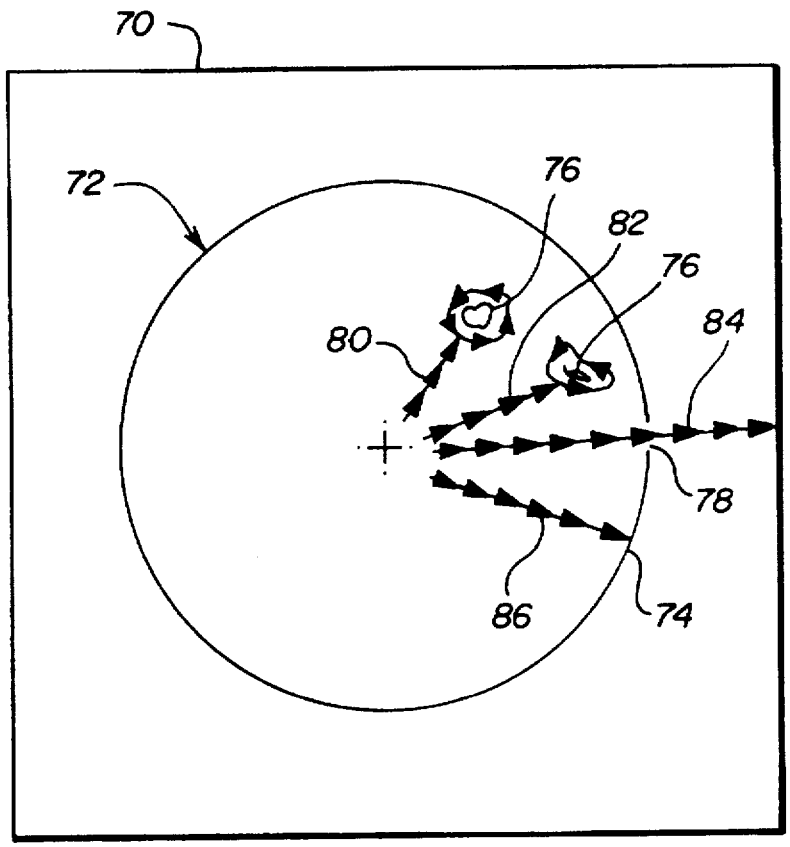
FIG. 3 is a diagram showing the technique used by the algorithm of the present invention for locating the lens on an image.

Turning now to FIG. 3, shown is the receptor field 70 consisting of a number of pixels (not shown). Within that field is the image of a contact lens 72. For this particular image the lens consists of edge 74 and defects or noise 76. Also found in this particular lens image is a gap in the edge 78.

The lens edge is located by starting from the center of the field with search vector 80 at a 45° angle. The search vector moves pixel-by-pixel radially away from the center of the field toward an expected encounter with the lens edge. The algorithm tests each pixel along the search vector until the edge criterion is satisfied; each pixel is compared to a gray level and a pre-determined, calibrated criterion. If the present pixel in the vector has a gray level lower than the value specified by the "trk_thres" parameter, then a pixel on the lens edge is assumed to have been encountered.

In order to verify that the object encountered is a lens edge, the vector then tracks the contour of the object found. In the case of search vectors 80 and 82, the algorithm recognizes that the objects encountered are not part of the lens edge because the curvature of the path does not match the expected curvature or circumference of a lens edge. This checking technique works simply by determining if the contour track walks back across the starting pixel within a specified number of pixels and this is determined to be small enough to be noise or a lens defect. If a noise object is encountered, then another search vector is generated in a clockwise rotational direction by approximately 11° and a search otherwise identical to the original vector is performed.

Another search vector 84 is shown to have travelled along a path that leads through a gap in the lens edge 78. The search vector continues until it reaches a boundary of the receptor field 70, at which point the search is terminated and another search vector 86 is begun approximately 11° clockwise from the previous search vector 84. In every case, the pixel to pixel search is done to adjoining pixels, either horizontally, vertically or diagonally in a stair-step fashion. For either of the two previous types of lens defects encountered, either defects in the body of the lens 76 or a gap in the lens edge 78, appropriate criteria may be applied and the lens rejected.

In the case of vector 86, the search is successful and the lens edge 74 is found. Verification that the feature found is indeed the lens edge is shown by reference to FIG. 4.

Starting from the good data point found in the previous step, the software follows the contour of the lens, using 4-connectivity tracking for about 90 pixels. Depending on the actual radius of the lens, r, the tracking distance used will differ image to image based on the formula:

$$\text{tracking distance} \partial T = (1024/F) \times (2 \text{``}\pi\text{''} r/30)$$

where,

F=14.5 mm (field of view).

Thus, T is usually 90 pixels for a 12.2 mm lens in deionized water. If distance T, around the lens edge is successfully travelled, a data point is recorded.

Thus location of the lens edge is verified. After a total of 30 more data points at 12° intervals are found, three simultaneous equations are solved for 10 groups of 3 points to determine the defined values of the average center of the lens and radius.

Figure 4:
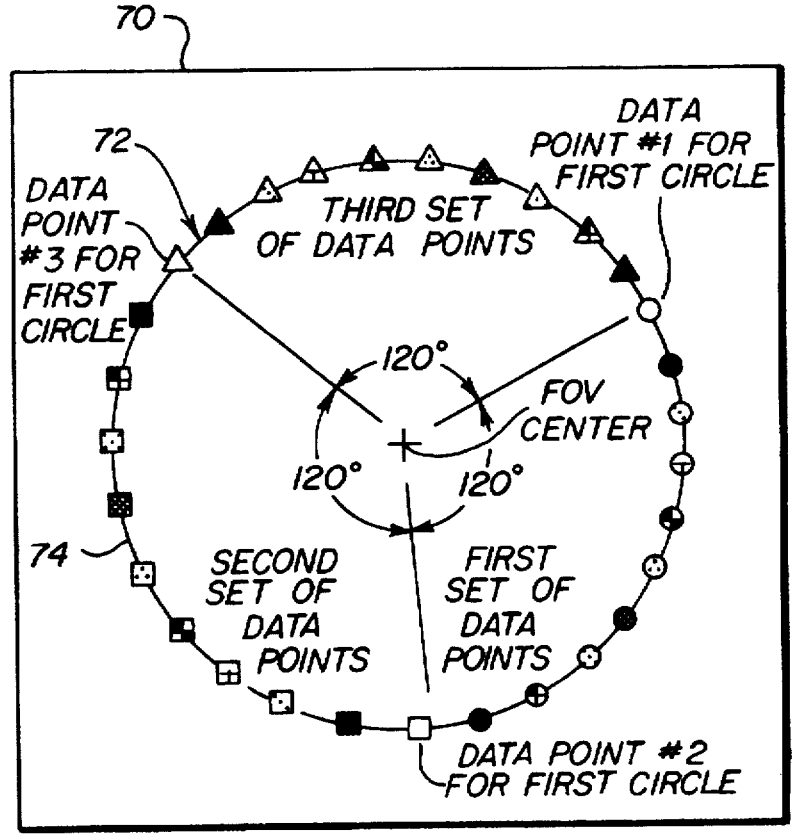
FIG. 4 is a representation of the manner in which data points are collected around a lens edge in sets of three.

In FIG. 4, the square, triangle and circular symbols represent points at which data have been collected. Symbols with the same internal patterns are collected in the same data set.

Figure 5:
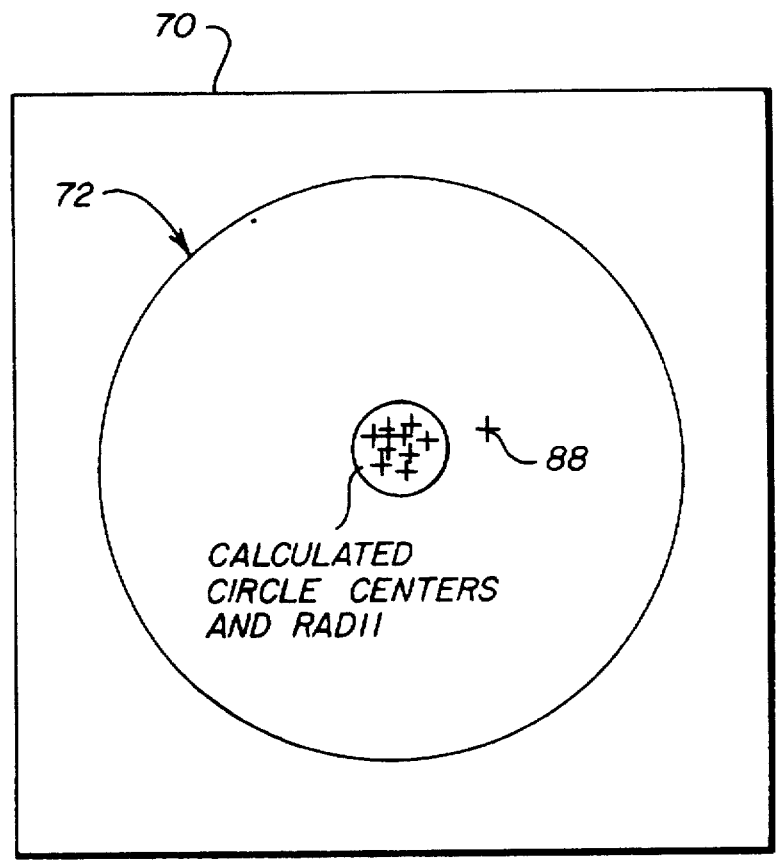
FIG. 5 is an example of the method by which a center and radius for evaluating the lens edge is determined from the previously gathered data points.

The ten data sets are then used to calculate equations for ten different circles where each circle represents a model of the lens edge. An average row pixel and column pixel circle center is calculated. Next, the distance from each of the ten circle centers to the average center is determined. Any center with a predetermined deviation from the center determined to be the statistical mode of the distribution of centers is then eliminated. This elimination is performed to remove spurious lens edges that may have resulted from data collected on defects that deviated from the normal lens edge. This is shown in FIG. 5 where center point 88 is shown as deviating from the remaining cluster of nine other center points due to lens edge aberration 87, and is therefore eliminated.

Standard deviations for the remaining row and column centers are then calculated and compared to a specific threshold. If both the row and column standard deviations meet the threshold criteria, then the lens is considered to be found. The radius used in the final model is the average of the remaining circle radii. If either standard deviation fails, then a new search factor is generated. The starting angle of this new vector is rotated from previous vectors in such a manner that data will not be collected from the same points along the lens edge. This nested iterative process of locating a lens and collecting data points is continued for a maximum of two cycles. If a lens is not successfully found within this time, the lens is considered missing and is automatically rejected.

Figure 6:
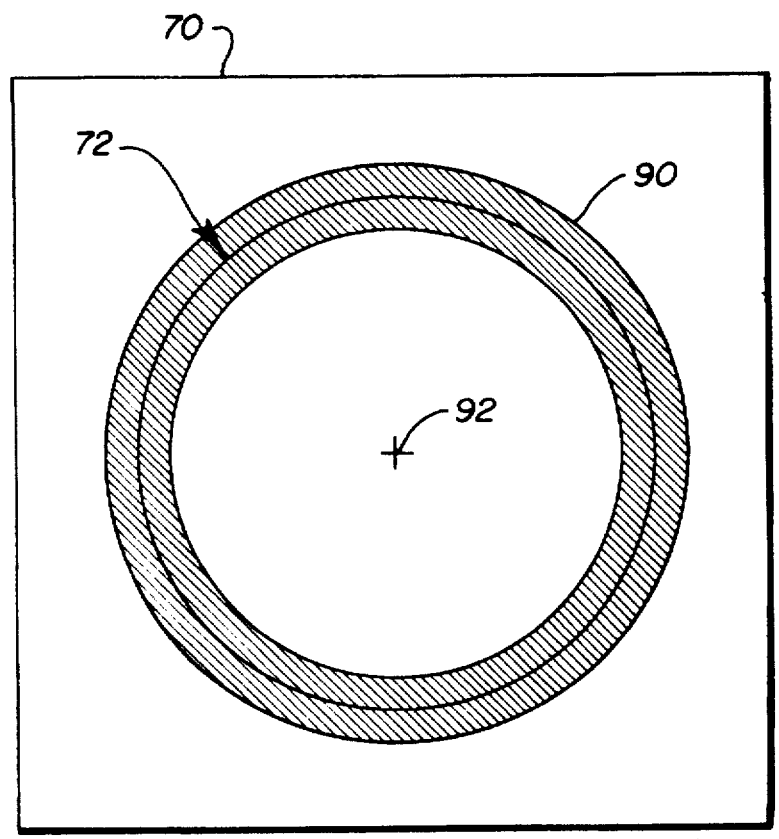
FIG. 6 is a representation of a processing annulus that is generated about the theoretical contact lens edge previously derived.

Turning now to FIG. 6, a processing annulus 90 is generated and superimposed about contact lens edge 72. Because this annulus is generated using the values for the center and radius previously derived and using an internal parameter for the width of the processing annulus, the boundaries of the processing annulus include with certainty the lens edge. All further processing on the image is conducted only within this annulus in order to increase speed and reduce processing time by limiting the number of pixels that need to be evaluated. The requirements placed upon the size of the annulus (and indeed the need to use a restrictive processing annulus at all), is dependent upon the available computer data-handling and processing and the costs associated therewith. The center of the annular ring is the circle modeled in the previous step of the algorithm. The width of the annulus in pixels is determined by the parameter "anls_width".

Figure 7:
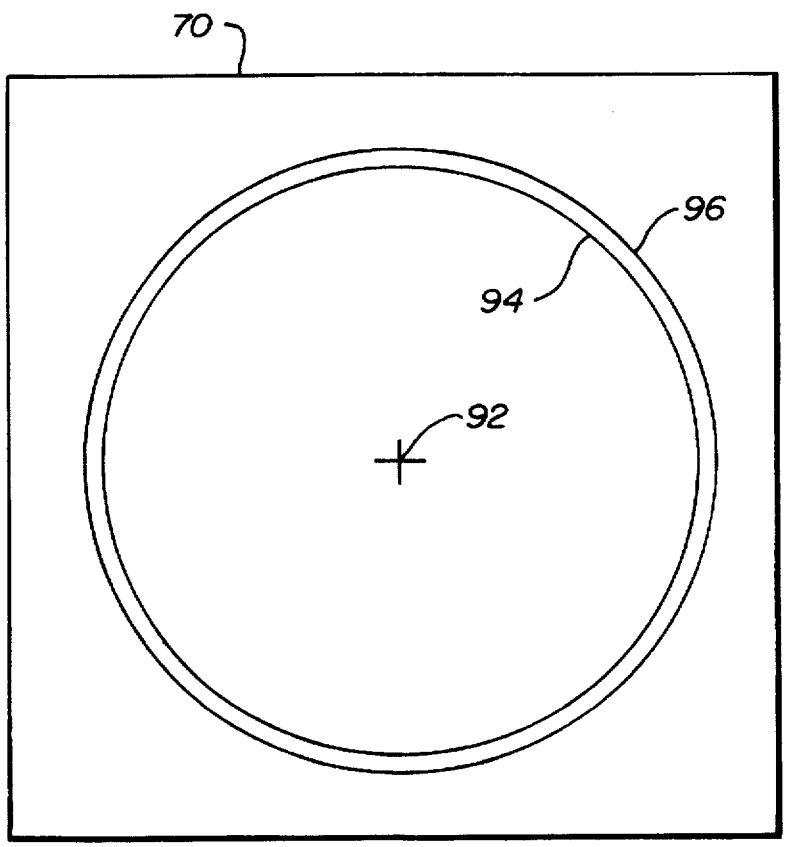
FIG. 7 is a representation of the results of the edge enhancement operator that yields two transitions to the lens edge producing an inner edge and an outer edge.

Turning now to FIG. 7, the next step in the algorithm is depicted, but with the processing annulus of the previous Figure not shown. Again shown on the sensor receptor field 70 is the average center 92. An edge enhancement operator is performed on the raw lens image because gray level information alone is not sensitive enough to allow distinction between normal and defective regions of a lens edge. Therefore, this operation is used to bring out distinguishing information contained along the inner and outer sides of the lens edge image. The operator utilized is a modified 3×3 operator that utilizes different zones around the lens edge. The contact lens edge 72 on the previous Figure has been eliminated in effecting the edge enhancement operator. The edge enhancement operator processes the raw lens edge image, which is 2 to 4 pixels wide into a separate inner edge 94 and outer edge 96 as shown in FIG. 6 after application of the edge enhancement operator on a raw lens image.

In order to effect the edge enhancement operator, the lens must be divided into different zones.

Figure 8:
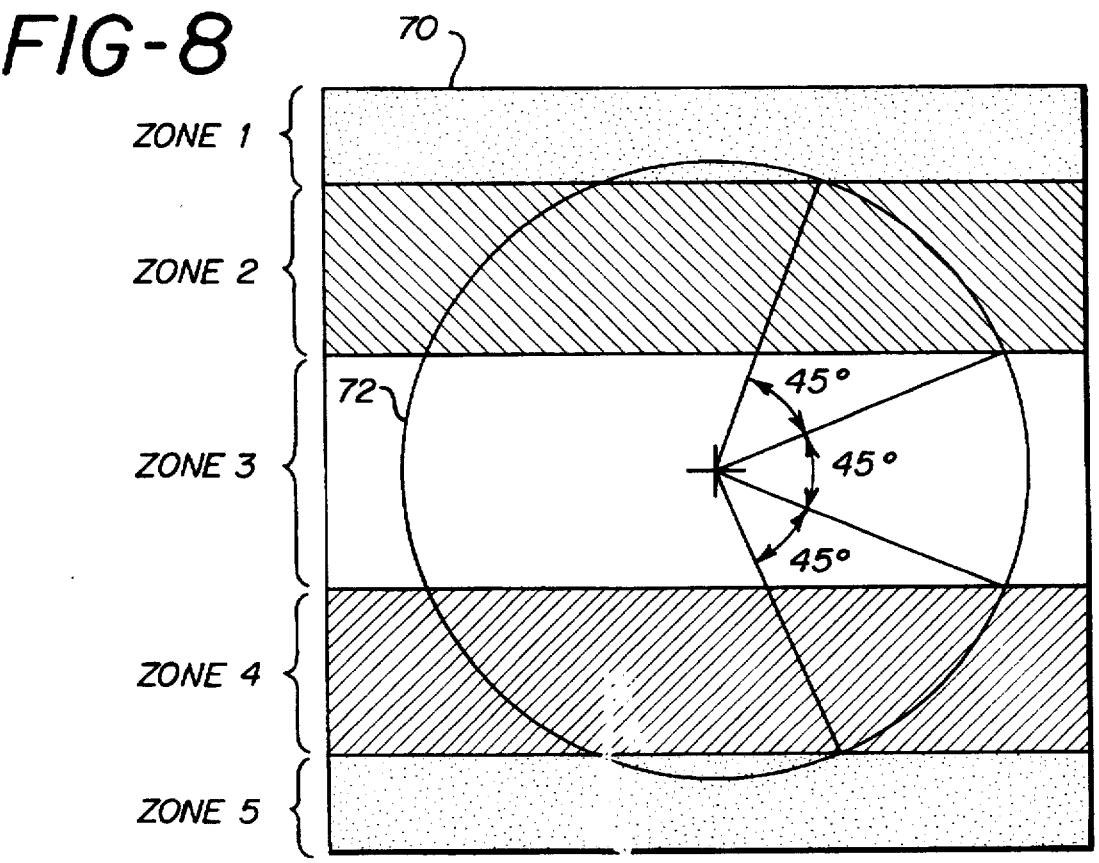
FIG. 8 is a representation of the different zones into which the lens is divided in order to employ different directional edge operators.

The exact beginning and end of the zones is dependent on the size of the lens in the image and the location of the lens within the image. Reference to FIG. 8 shows the relationship between the five zones used in a lens. The zones were established to separate the mostly horizontal, vertical and diagonal regions around the lens.

Each of the zones in FIG. 8 uses a different directional edge operator. For zones 1, 3 and 5, a diagonal operator is used. For zones 2 and 4, a horizontal/vertical operator is used. Different directional operators are used to compensate for the curvature of the lens and to equalize gradient magnitude around the lens. That is, a diagonal operator on a mostly vertical portion of the lens is roughly equivalent to a horizontal/vertical operator on a mostly diagonal portion of the lens.

The edge operator is made to be diagonal with respect to the edge being processed in order to suppress unwanted dither. The thickness of a normal raw lens edge fluctuates slightly in localized regions. An edge operator operating parallel and perpendicular to the direction of the raw lens edge image would therefore tend to pick up fluctuations and mistakenly preserve small deviations in the edge. The feature extraction software would then view these small deviations as edged defects.

Figures 9, 10:
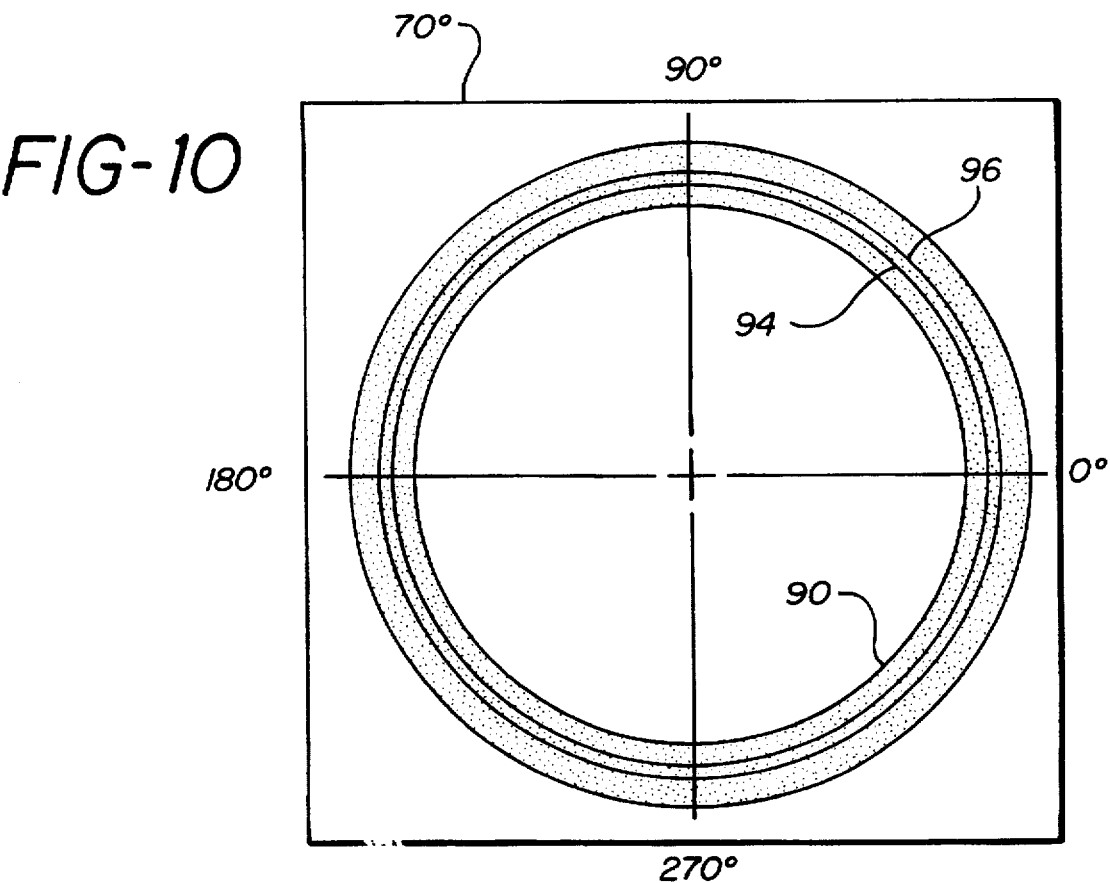
FIG. 9 is a diagram showing the notation used by the equations employed in the algorithm of the present invention for denoting different pixel locations.
FIG. 10 is a diagram showing the convention used for angular notation in a lens image.

Turning now to FIG. 9, shown is the pixel notation used in the implementation of the edge enhancement operators. As can be discerned by one of ordinary skill in the art, this notation is the standard notation used in designating the elements in a matrix or an array.

The following equations 1–6 show the algorithm used for the two edge operators. The resulting gradient values for each pixel is then scaled to fall within the 8 bit range from 0 to 255.

$$\text{Horz/Vert Operator} = abs(hdif) + abs(vdif)$$

where, $$hdif = P_{i-1,j+1} + 2*P_{i,j+1} + P_{i+1,j+1} - (P_{i-1,j-1} + 2*P_{i,j-1} + P_{i+1,j-1})$$

$$vdif = P_{i+1,j+1} + 2*P_{i+1,j} + P_{i+1,j-1} - (P_{i-1,j+1} + 2*P_{i-1,j} + P_{i-1,j-1})$$

$$\text{Diag Operator} = abs(d1dif) + abs(d2dif)$$

where, $$d1dif = P_{i-1,j} + 2*P_{i-1,j-1} + P_{i,j-1} - (P_{i,j+1} + 2*P_{i+1,j+1} + P_{i+1,j})$$

$$d2dif = P_{i-1,j} + 2*P_{i-1,j+1} + P_{i,j+1} - (P_{i,j-1} + 2*P_{i+1,j-1} + P_{i+1,j}).$$

After diagonal edge enhancement is performed in zones 1, 3 and 5, and horizontal/vertical edge enhancement is performed in zones 2 and 4, the resulting inner and outer edges are operated upon with a skeletonization operator. The resulting edges are typically a single pixel wide and contain information only from the strongest part of the edge as viewed from the edge's cross section. During this procedure, however, the gray level information contained in those pixels is retained. Edge enhancement in this manner is done in a matching direction to the gradient operators used in the respective annulus zones. Operating only on the gradient information from the previous step, this operation searches for peaks in four directions from the pixel-of-interest. If it finds a peak, it replaces the pixel-of-interest with that value. Otherwise the pixel goes to zero, resulting in the image found in FIG. 7.

The next step in the algorithm is to locate and track the newly enhanced and skeletonized inner and outer lens edges by using a threshold mechanism. Thresholding is performed only along the lens contour while the edge is being tracked.

The next step in the algorithm is the application of a threshold to selected pixels above a specified pixel intensity value. The purpose of applying a threshold operation is to eliminate all pixels within the annulus that are no longer part of the edges of interest and appear as noise. The gray level value used for thresholding is the "inner_thr" and "outer_thr" parameters, for the inner and outer edges respectively. These are the threshold values used in the algorithm to track the contours. Implementation of the threshold operation is as follows:

If ($P_{i,j}$>=Threshold and is a pixel along the processed lens edge) then $P_{i,j}$=a contour pixel Shown in FIG. 9 is the angular notation used for a lens in an image within sensor field 70. To locate the lens edge to initiate tracking, a search vector similar to the one used initially to locate the lens is employed. In this instance the search vector uses only gray level as a criteria in searching for the next pixel.

Referring to FIG. 10, the vector starts just inside the processing annulus at zero degrees and proceeds along a row of pixels until it encounters the lens edge or until it reaches the opposite side of the processing annulus.

Figure 11:
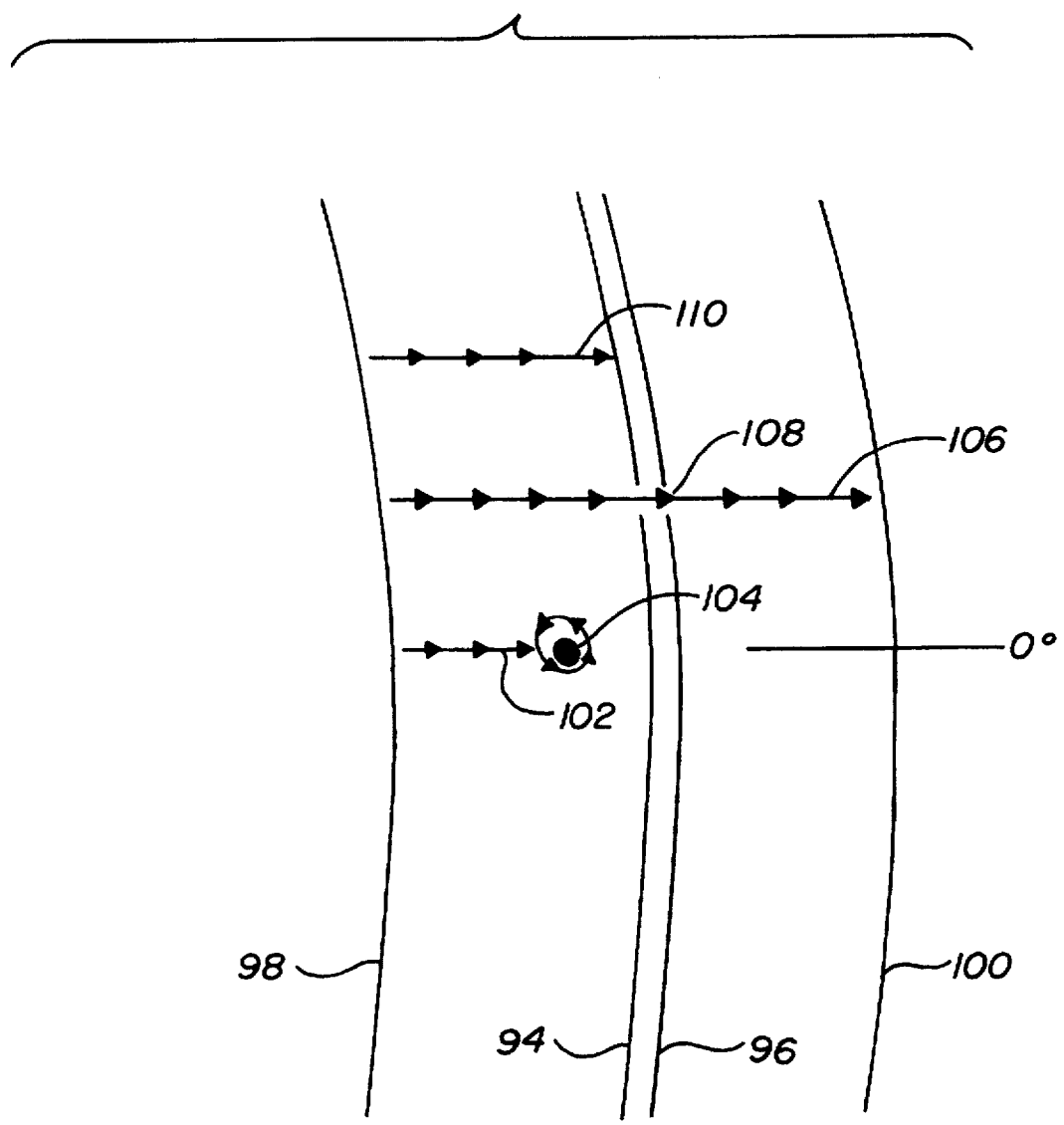
FIG. 11 is a representation of different outcomes resulting from the application of search vectors to locate the lens within the processing annulus.

Referring to FIG. 11, the possible search scenarios for an inner edge are displayed.

Shown in this Figure is an enlarged portion of an enhanced lens edge showing inner edge 94, outer edge 96 and processing annulus 90. The processing annulus 90 is comprised of the inner boundary 98 and the outer boundary 100.

Shown by way of example as described above is a first search vector 102. In the example of this first search vector a small defect or noise 104 is encountered because this noise or small defect 104 has a distinctive gray level. The search vector traces its boundary but the algorithm rejects this object because the curvature does not match that of a lens edge as can be determined by the number of pixels traced before encountering the beginning pixel.

After such a failed attempt to locate the edge, a second search vector is generated offset from the previous one by 20 rows of pixels. By way of example, this second search vector 106 attempts to locate the lens inner edge 94 by beginning at the inner boundary of the processing annulus 98 and going toward the outer boundary annulus 100. In this example, search vector 106 does not encounter pixels distinctive of a lens edge and passes through a gap 108 and the inner edge 94 and outer edge 96. Once the search vector reaches the outer boundary of processing annulus 100 the search is terminated.

A third search vector 110 is then generated again 20 pixel rows offset from the second search vector 106. In this example of the third search vector 110, the attempt to find the inner lens edge 94 is successful and the algorithm then concentrates on tracing the inner and outer lens edges 94 and 96.

The process of generating a new search vector whenever a previous vector is unsuccessful due to encountering a small defect or a gap in the lens edge, is repeated until the lens edge is located or a maximum of 15 attempts have been made. This location process is conducted separately for the lens inner edge 94 and the lens outer edge 96.

Once an edge has been located 8-connectivity contour following is performed. The vector starts at 0 degrees and tracks the inner and outer contours of the lens edge using 8-connectivity. Eight-connectivity ensures that any pixel attached to the edge will be included in the final contour. A gray level threshold is used to determine if a pixel is part of the edge by using the value of the "inner_thr" parameter for the inner edge and the value of the "outer_thr" parameter for the outer edge.

The algorithm takes a right hand turn if the pixel just entered is an edge pixel and a left hand turn if the pixel entered is not an edge pixel. Diagonal pixels are checked when special circumstances are met. Since the same code is used to track the inner and outer edges tracking occurs in a clockwise direction for the inner edge and in a counterclockwise direction for the outer edge.

When completed, the lens edge consists of approximately 6000 pixels, 3000 on the inner edge and 3000 on the outer edge. If the number of pixels is not within the established limits, the algorithm determines that a lens was not found and then the process can either be repeated or the package rejected.

For each pixel on the edge, a set of information is saved in an array of structures. This information includes radial and angular position, gradient gray level, defect type and severity. At this point in the algorithm not all the lens array information yet exists, but memory is allocated for future use.

If a pixel is found to be part of the edge, a transformation from rectangular coordinates to polar coordinates is performed. The center of the rectangular and polar coordinate systems is the lens center determined from initially locating the lens. The following equations show how the transformation is implemented, where theta is the angle and r is the radius.

$\theta$=arctan [(lens center row−pixel row)/(pixel column−lens center column)]

R=SQRT [(pixel column−lens center column)$^2$+(lens center row−pixel row)$^2$]

Theta is converted from a floating point value ranging from 0.0 to 360.0 degrees to an integer value ranging from 0 to 8191, representable by 13 bits, $2^{13}$. R is also initially calculated as a floating point value and truncated to an integer value.

Radius and angular displacement values for each contour pixel are then placed into the large array of structures. Further processing is made more efficient by only operating on the 6000 or so pixels found in this large array.

In the following figures the lens edge is shown pictorially. The operations however, are done by the algorithm in the digital domain.

Figure 12B:
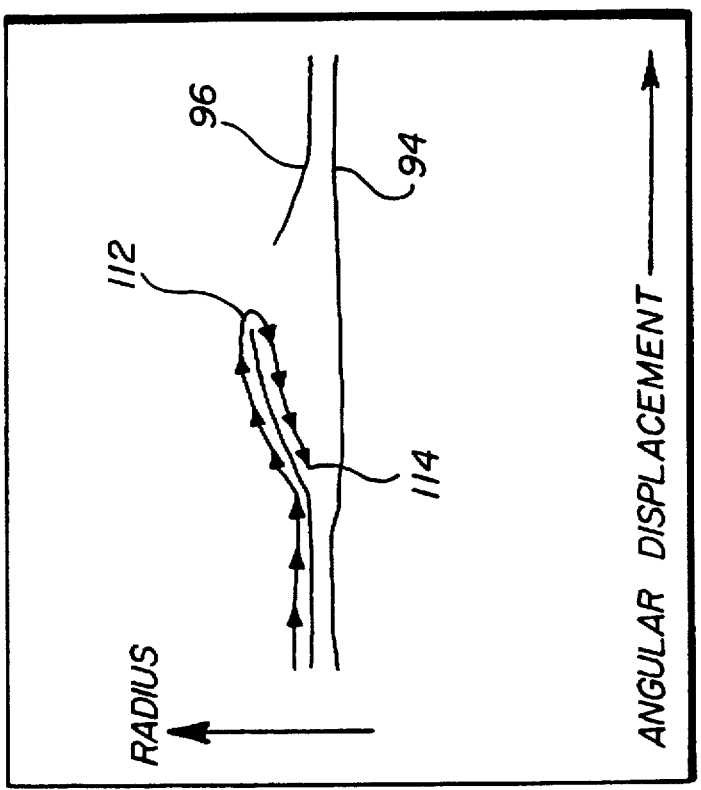
FIG. 12 shows in FIG. 12a the rectangular coordinates and in FIG. 12b polar coordinates, a discontinuity in an enhanced lens image and the pixel processing that occurs to detect a discontinuity.
Figure 12A:
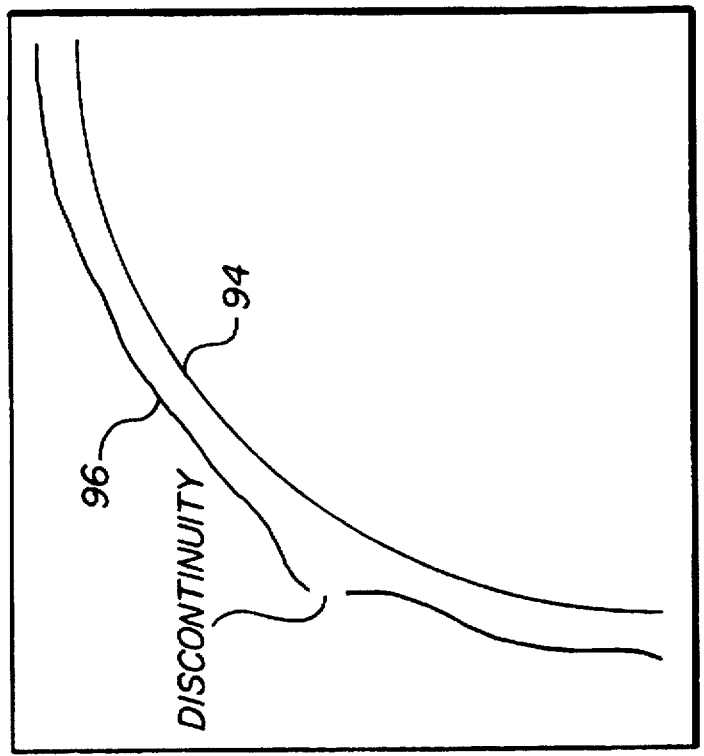

Turning now to FIG. 12, shown is the enhanced lens image in rectangular coordinates in 12a, and in polar coordinates in 12b. Since the edge has been found and traced, the processing annulus is deleted from this Figure. Shown in FIGS. 12a and 12b are the lens inner edge 94 and lens outer edge 96. In the operation depicted in FIG. 12, discontinuities in the edges are caused by defects on the lens, weak edges, or anomalies resulting from the edge and edge enhancement operators. Regardless of the cause, it is necessary to detect and bridge these discontinuities so that the remaining portion of the edges can be processed.

The discontinuity is detected by maintaining the angular displacement of the furthermost pixel that has been tracked, and comparing it to the angular displacement of the pixel that is presently being processed, this is shown in 12b. If the angle generated between the furthermost pixel 112 and the present pixel is in the direction opposite of tracking and if it is greater than the angle specified by the parameter "bktrk_degs" then a discontinuity has been detected. This is shown in FIG. 12b at the point indicated by 114.

When a discontinuity is detected the algorithm uses the furthest most pixel as a reference for bridging. The initial attempt to bridge a discontinuity is a extrapolation technique which is capable of bridging a 1 to 3 pixel gap. Extrapolation uses the direction of travel just before reaching the discontinuity.

In some instances the gap in the edge is more than 3 pixels and cannot be bridged by extrapolation. Referring to FIG. 13, in those cases where extrapolation is not successful in closing a discontinuity such as 116, a jumping technique is used. The jumping technique takes the angular location of the discontinuity, rotates in the direction of tracking by the number of degrees specified in the parameter "gap_angle" and initiates a search vector to locate the other side of the discontinuity.

The search vector begins just inside the interior of the processing annulus and searches along a row or column depending on the angular location of the discontinuity. The search continues until an edge pixel is encountered or until the outer edge of the processing annulus is reached. If an edge pixel is not found during the search the lens is considered to be grossly distorted and the lens is rejected. If an edge pixel is found, processing continues as normal. The fact that the discontinuity could not be bridged by extrapolation indicates the presence of a defect and a "Bridge by Jump" is identified as a feature.

All pixels that were processed since the furthest most pixel and continuing until the discontinuity was detected, are removed from the contour array since they represent backtracking by the edge tracking.

Figure 13B:
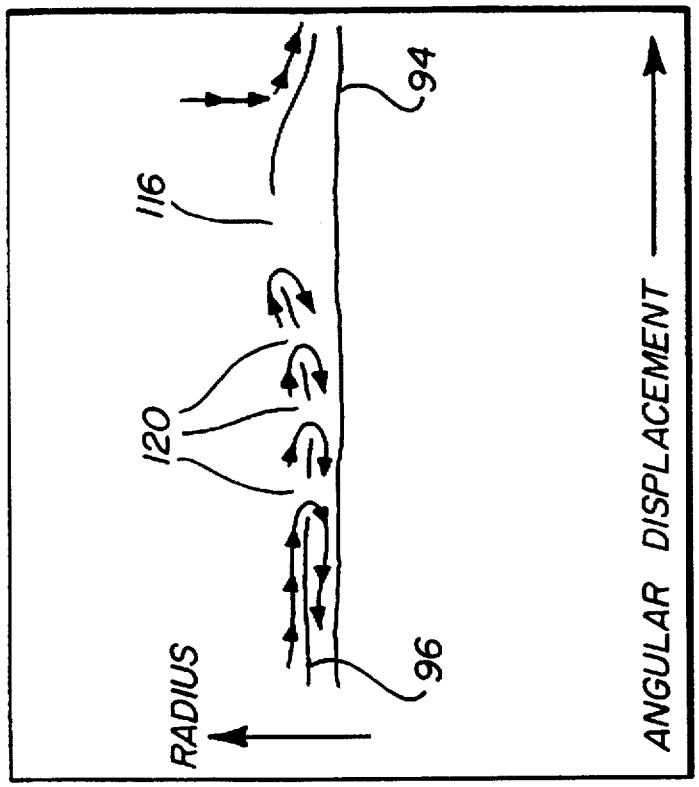
FIG. 13 shows in rectangular coordinates in FIG. 13a and in polar coordinates in FIG. 13b, a representation of bridging of a fragmented portion of a lens. Initial bridging uses an extrapolation technique, the last bridging uses a jumping technique.
Figure 13A:
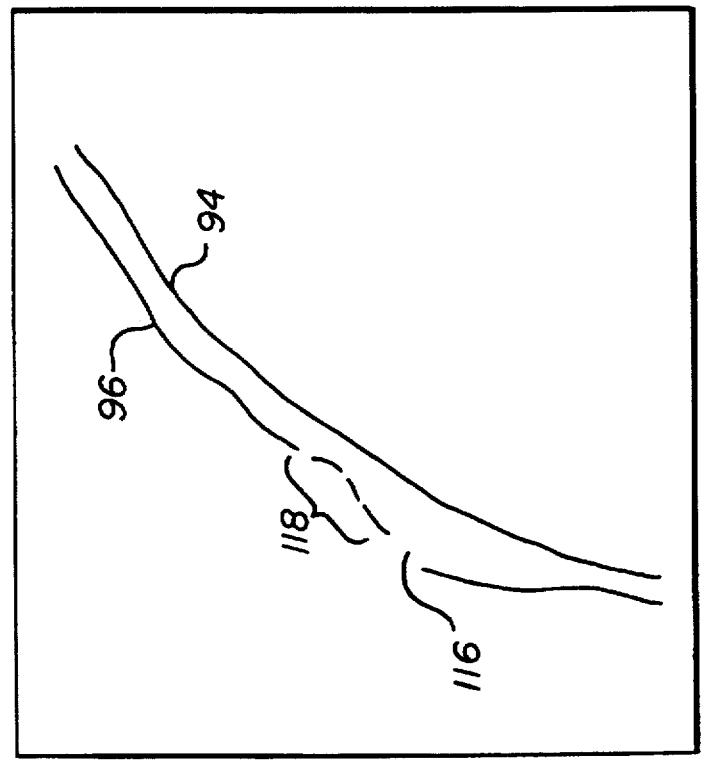

Sometimes a portion of the lens edge is fragmented in such a manner that bridging one discontinuity places the tracking process onto a small isolated section of the edge 118 shown in FIG. 13a. In this case, the normal method for detecting a discontinuity does not work because it is not possible for the tracking process to double back the required amount. In order to overcome this anomaly, a special detection technique is implemented. This technique retains the row and column values for the pixel entered just after bridging a discontinuity. If further tracking passes back through this entry pixel four times, a small, isolated portion of the edge has been detected. The furthermost pixel found on the fragment is then used as the location to attempt another bridging. In FIG. 13b a scenario is shown involving multiple bridging 120 followed by a "Bridge by Jump" discussed earlier as 116.

Bridging multiple isolated sections of an edge is an iterative process that is performed as many times as required to span the fragmented section. Each iteration will first attempt an extrapolation bridge and then a jump bridge.

After the edge has been tracked, and any gaps bridged, the algorithm extracts six different features from each pixel found on the edge contour. The features are identified as:

Radial Deviation (RD)
Localized Gradient Deviation (LGD)
Spatial Derivative (SD)
Discontinuity (D)
Dip Localization Gradient Deviation (DLGD)
One-tail Localized Gradient Deviation (ALGD)

The last two features are related to the Localized Gradient Deviation and are added to identify specific types of defects that may otherwise be undetectable.

Values calculated for each of these features are compared to thresholds. All threshold values are accessible as user parameters. If a feature value meets the threshold criteria then the pixel is classified as defective based on that feature. It is possible for a single pixel to be classified as defective by more than one feature.

Figure 14B:
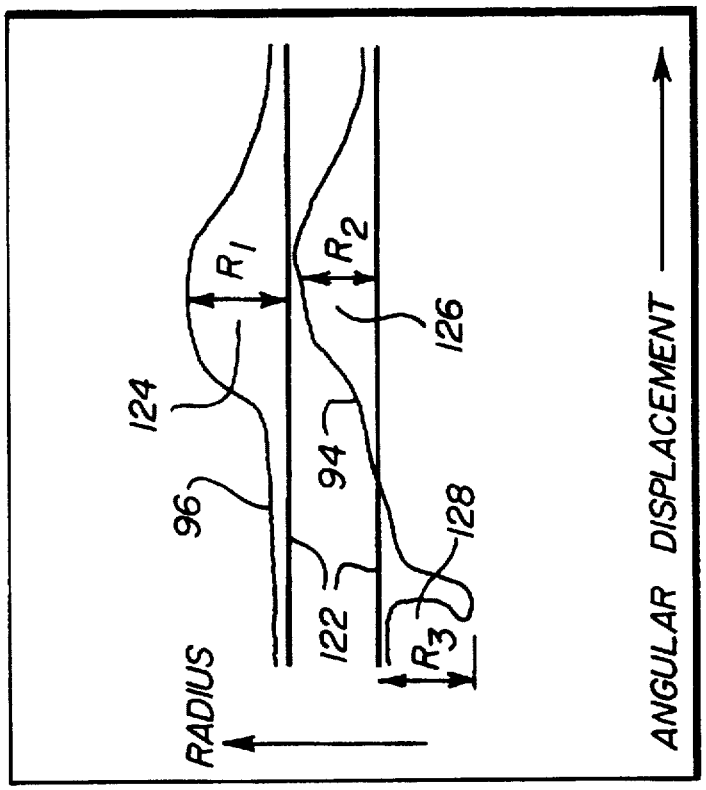
FIG. 14a is in rectangular coordinates and FIG. 14b is in the polar domain.
Figure 14A:
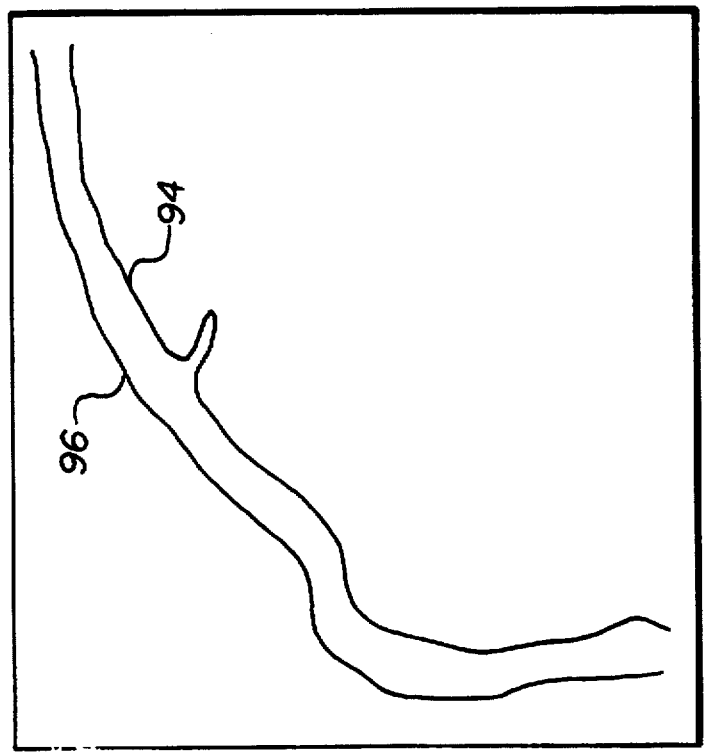
Figure 16B:
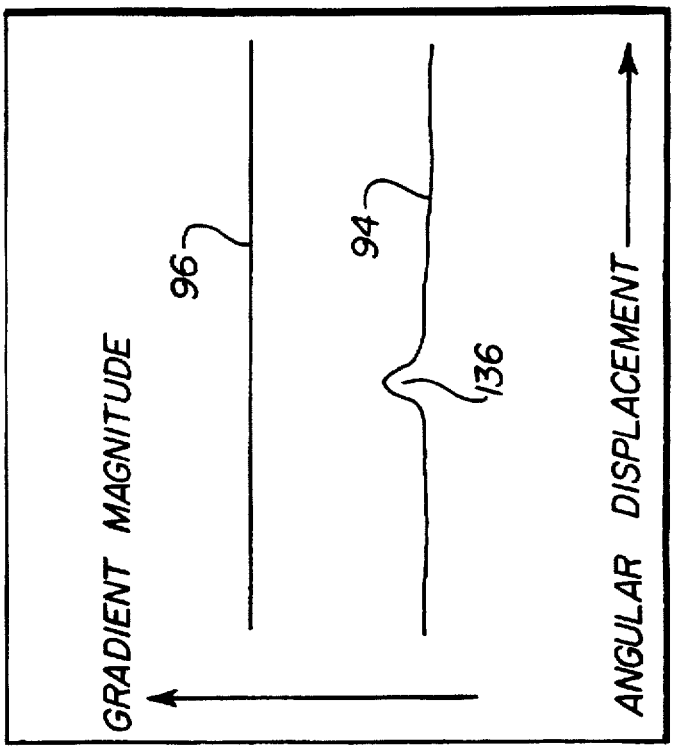
FIG. 16 shows in rectangular coordinates in FIG. 16a and polar coordinates in FIG. 16b, gradient extraction derived from pixel processing.
Figure 16A:
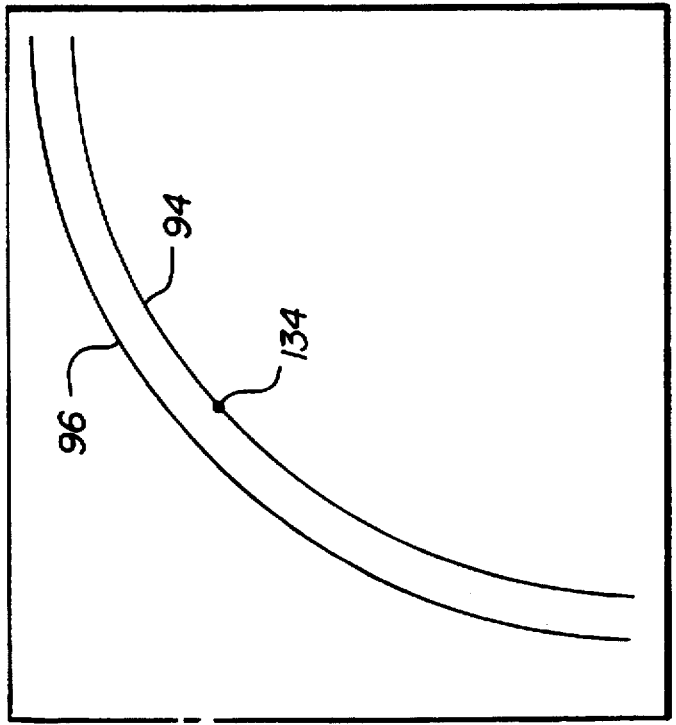

Turning now to FIG. 14, shown is the enhanced lens edge in rectangular coordinates in FIG. 14a and polar coordinates in FIG. 14b and having features that can be categorized as radial deviation. Radial deviation is the distance that the radius of the pixel-of-interest deviates from the nominal radius. If the deviation is equal to or greater than the value specified in the parameter "rad_dev_thr" then the pixel is considered to be defective. The normal radius is defined as the average radius value of the 250 contour pixels before and the 250 contour pixels after the pixel-of-interest. If a pixel is classified as defective from Radial Deviation then the amount of deviation is retained as an indication of severity. In FIG. 14a and 14b the inner lens edge 94 and outer lens edge 96 are shown. In addition FIG. 14b also shows the ideal radii for the inner and outer edges 122 calculated as given above. FIG. 14b also shows three examples of radially deviant features 124, 126 and 128. The equations used to implement the radial deviation feature extraction are given as follows:

$$RD = R_i - \left( \sum_{n=i-250}^{i-1} R_n + \sum_{m=i+1}^{i+250} R_m \right)/500$$

where,
R=Radius value and,
i,n,m=Contour index values.
if (RD>=Threshold or RD<=−Threshold) then Pixel-of-interest is Defective The next feature that is extracted is the Localized Gradient Deviation. The LGD looks at the amount of deviation in the gradient value of the pixel-of-interest from the average of localized neighbors. Neighboring pixels are considered to be those pixels closest to the pixel-of-interest while following the contour of the edge. Referring to FIG. 15 the pixel-of-interest 130 is given the designation i. The threshold used to determine if a pixel is defective, based on LGD, is from the "grd_dev_thr" parameter. The following equations show the actual implementation of this feature.

$$LGD = \frac{G_{i-1} + G_i + G_{i+1}}{3} - \left( \sum_{n=i-11}^{i-2} G_n + \sum_{m=i+21}^{i+11} G_m \right)/20$$

where,
G=Gradient value and,
i,n,m=Contour index values
if (LGD>=Threshold) then Pixel of Interest=Defective This process of extracting the Localized Gradient Deviation is shown in FIG. 16. Once again FIG. 16a is a pictorial representation of the enhanced lens edge whereas, 16b is a representation of gradient information in the polar domain. As can be seen a Localized Gradient Deviation 134 shown in FIG. 16a occurs only on one edge of the enhanced lens edge image and when traced and displayed in the polar domain appears as an unpaired irregularity 136. If a pixel is classified as defective based on LGD then the amount of deviation is retained as an indication of severity.

The next feature considered in feature extraction is Discontinuity. As discussed earlier, a discontinuity defect is caused by bridging an edge discontinuity with the jump technique. It is identified through feature extraction by looking at the difference in angular displacement from one pixel in the contour to the next. Discontinuity contains no severity information and only indicates that a jump was found. Initial pixels on either side of the discontinuity are considered defective.

The next feature extracted is the Dip Localized Gradient Deviation. The Dip Localized Gradient Deviation is similar to the Localized Gradient Deviation feature which has been extracted. Like LGD, DLGD looks at the amount of deviation in the intensity gradient value of the pixel-of-interest from the average of its localized neighbors. The difference is that more neighbors are used and there is a larger gap of unused pixels around the pixel-of-interest. DLGD is also designed to be sensitive only to gradient deviations in intensity that are less than their neighbors and is, therefore, referred to as the "Dip" Localized Gradient Deviation.

The threshold used to determine if a pixel is defective based on DLGD is from the "dip_lgd_thr" parameter. The following equations show the actual implementation of this feature.

$$DLGD = \frac{G_{i-1} + G_i + G_{i+1}}{3} - \left( \sum_{n=i-35}^{i-5} G_n + \sum_{m=i+5}^{i+35} G_m \right)/60$$

where,

G=Gradient value and, i,n,m=Contour index values if (DLGD<=Threshold) then Pixel-of-interest is Defective The DLGD feature is implemented specifically to identify small edge chips which are not identified by other features. If a pixel is classified as defective based on DLGD then the amount of the deviation is stored as an indication of severity.

Another feature which is extracted is the One-Tail Localized Gradient Deviation (ALGD). In extracting this feature the pixel neighbors used to calculate deviation are taken from a single side of the pixel-of-interest. Twenty pixels before the pixel-of-interest are used to determine the neighborhood average. The four pixels just before the pixel-of-interest, however, are not used. ALGD looks at both the negative and positive gradient deviations.

Threshold values used for comparison are stored in the parameters "aux_lgd_low" and "aux_lgd_up". The following equations show the implementation of the ALGD feature.

$$ALGD = \frac{G_{i-1} + G_i + G_{i+1}}{3} - \left( \sum_{n=i-25}^{i-5} G_n \right)/20$$

where,

G=Gradient value and, i,n,m=Contour index values if (ALGD>=Upper Threshold or LowerALDG<=Threshold) then Pixel-of-interest is Defective.

The final feature which is extracted is the Spatial Derivative (SD). The Spatial Derivative measures the change in radius verses the change in angular displacement. If sharp a change in radius occurs over a small angular distance, then it is likely that a defect is present. The Spatial Derivative feature is depicted in FIG. 17. Again, FIG. 17a shows the enhanced lens edge in rectangular coordinates and FIG. 17b is translated to the polar domain showing again the ideal radii 122 for the inner lens edge 94 and the outer lens edge 96.

Figure 17B:
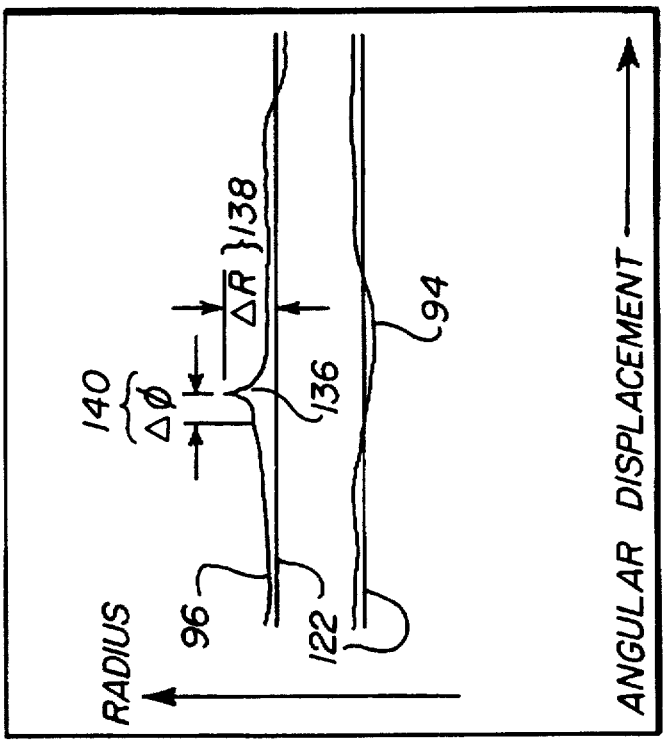
FIG. 17 shows in 17a in the rectangular domain and in 17b in polar coordinates, the method by which Spatial Derivative features are extracted from the lens edges.
Figure 17A:
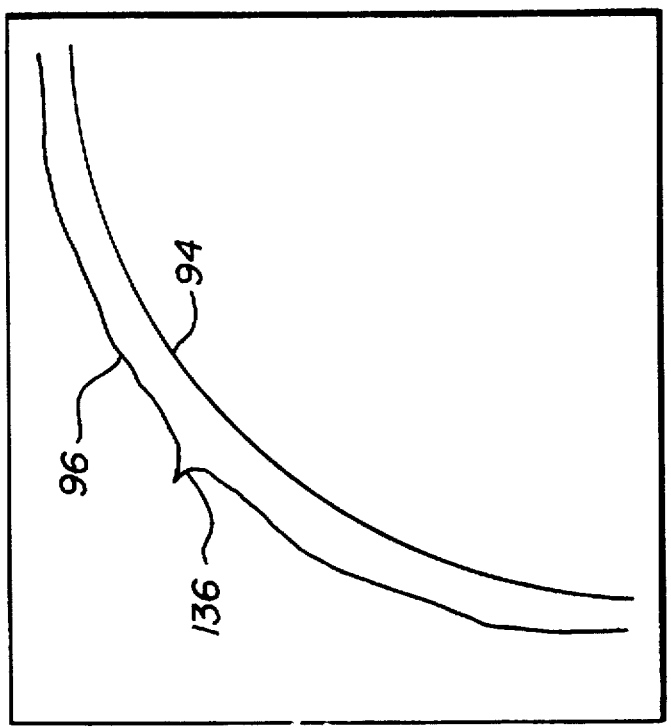

The defect with Spatial Derivative features 136 is shown and in FIG. 17b its change in radius 138 over the angle 140 is depicted.

Implementation of the Spatial Derivative feature is given by the following equations:

$\Delta R$=abs(Radius Value of Contour Pixel $_{i+2}$–Radius Value of Contour Pixel $_{i-2}$)

where, $\Delta R$=Change in radius and, i=Contour index referenced to the pixel-of-interest $\Delta \theta$=Angular Displacement Value of Contour Pixel $_{i-2}$–Angular Displacement Value of Contour Pixel $_{i+2}$ where, $\Delta \theta$=Change in angular displacement and, i=Contour index referenced to the pixel-of-interest.

$SD = \Delta R / \Delta \theta$ where,

SD=Spatial Derivative if (SD>=Positive Threshold or DS<=0) then Pixel-of-interest is Defective If a pixel is classified defective according to the final above equation no severity information is retained. Further processing by the algorithm is based only upon the fact that the pixel has been deemed defective based upon SD.

After making the pixel level judgments, each defective pixel is considered for membership in a defect group. There can be many defect groups around the lens, and for a pixel to belong in a group it must be close to other defective pixels.

Defect grouping involves three steps. The first two steps are performed independently on the inner and outer edge, and the last step combines information from both the inner and outer edges. After completing the grouping process on the inner and outer edges the proximity of the resulting groups are compared to see if any groups from the inner edge should be combined with groups from the outer edge.

If such a merger takes place, a combination defect group is formed.

The initial step looks at each defective pixel on a pixel-by-pixel basis and decides if it is part of a larger defect. If a pixel is determined to be part of a larger defect then it is placed into a structure called a defect group.

The second step determines if any of these defect groups should be combined with each other to form larger groups. The final step compares inner and outer defect groups with each other to determine if they should be combined. The result is the largest possible defect group to represent the discreet defect on the lens. This in turn provides the most accurate representation of true defect severity. Clearly, combination defects are more severe than single defect groups and only occur on the more serious edge defects.

As previously stated, the process is begun by grouping on a pixel-by-pixel basis. The very first defective pixel that is encountered is automatically placed into a single pixel defect group to start the process. The angular displacement of subsequent defective pixels are compared to the furthest most pixel in the currently active defect group. If the pixel is within the angular displacement specified by the parameter "prox_zone" it is placed within the group, and the group's furthest most angle is updated. If the defective pixel does not fall within the currently active defect group, then a new defect is considered to be encountered. The result is that a new defect group containing only the present defective pixel is formed and becomes the currently active group. This process continues until all defective pixels on the edge are checked.

If non-defective pixels on the contour are found in between a pixel that is about to be placed in a defect group, they are also included in the defect group and reclassified from non-defective to group-type defective pixels.

The second step of the overall grouping process is as follows. It is possible that a single defect is represented by more than one defect group. In order to eliminate this complication, a pass is made over all the defect group's found on an edge. Two comparisons are made. One comparison checks a group's starting angular displacement with another group's ending angular displacement. The second comparison checks the same groups ending angular displacement with the other group's starting angular displacements. If either one of these comparisons results in a change of angular displacement less than the amount specified by "prox_angle", the two groups are merged. The group with a starting angle close enough to another group's ending angle is then made to include the group. The group that is included transfers its information and then is invalidated.

Finally, angularly corresponding inner and outer edge defect groups are grouped together. This grouping is similar to the grouping performed independently on the inner and outer edges. A comparison is made between groups' starting and ending locations. An extra comparison is also made to determine if one group is completely surrounded by another group. If any of these comparisons result in a merger, then a separate structure that contains information from both defect groups is created and the two original groups are invalidated.

After the defective pixels are identified and the above grouping operations have taken place, a severity score is assigned to each defect group. The severity score is the summation of all scores assigned to the individual pixels within that group. When a single pixel is classified defective by a more than one type of defect, the result is a multiple score for that particular pixel.

Each defect type is assigned a weight which allows the different defects to have different strengths with respect to each other. Values for all weights can be controlled by user accessible parameters. RD, LGD, SD, D, DLGD and ALGD weights are found in the parameters "rd_weight", "lgd_weight", "sd_weight", "disc_weight", "dip_lgd_wgt" and "aux_lgd_wgt" respectfully.

Unlike the other three defects, the RD, LGD and DLGD defects retain severity information for a given pixel. This severity information is normalized and multiplied by the defect-type weights assigned for each of the affected pixels. Normalization is used because the range of values for the different features are not comparable. After normalization, each weighted score will fall between 1.0 and 2.0. The normalization range is determined by the values of the threshold being used and minimum or maximum theoretical values the feature can obtain.

By way of example, if a pixel's feature has the same value as the nominal value, its weighted score be 1.0. In contrast, if a pixel's feature has a value equal to the extreme maximum or minimum value that is possible, then the weighted severity score is calculated as 2.0. The maximum theoretical value for Radial Deviation and Localized Gradient Deviation are determined by the parameter values found in "max_rd" and "max_lgd" respectfully. The minimum theoretical value for Dip Localized Gradient Deviation is found in the parameter "min_dip_lgd".

SD, ALGD, group and D type defect are not normalized in any manner. "Discontinuity" and "group" are Boolean type defects having values of 0 or 1. Spatial Derivative and ALGD do not contain sufficient severity information to make it worth retaining.

The pixel defect severity equations are given as follows for each of the six types of defects, along with any appropriate normalization and weighting.

$$RD\ Score = (1.0 + (abs(Pixel\ RD\ Value) - RD\ Threshold)/$$
$$(Max.\ Theoretical\ RD\ Value - RD\ Threshold)) * rd\_weight$$

where,
RD Score=Total Score assigned to a pixel from RD classification,

Pixel RD Value=RD feature value for the pixel-of-interest,

RD Threshold=Threshold value used to determine if an RD defect exists,

Max. Theoretical RD Value=Maximum possible value from the RD feature, and rd_weight=Weight associated with RD defect type.

$$LGD\ Score = (1.0 + (Pixel\ LGD\ Value - LGD\ Threshold)/$$
$$(MAX\ Theoretical\ LGD\ Value - LGD\ Threshold)) * lgd\_weight$$

where,
LGD Score=Total score assigned to a pixel from LGD Classification,

Pixel LGD Value=LGD feature value for the pixel-of-interest,

LGD Threshold=Threshold value used to determine if an LGD defect exists,

Max Theoretical LGD Value=Maximum possible value from the LGD feature and, lgd_weight=Weight associated with LGD defect type.

$$DLGD\ Score = (1.0 + (Pixel\ DLGD\ Value - DLGD\ Threshold)/$$
$$(Max\ Theoretical\ DLGD\ Value - DLGD\ Threshold)) * dip\_lgd\_weight$$

where,
DLGD Score=Total score assigned to a pixel from DLGD classification

Pixel DLGD Value=DLGD feature value for the pixel-of-interest,

DLGD Threshold=Threshold value used to determine if an DLGD defect exists,

Max. Theoretical DLGD Value=Maximum possible value from the DLGD feature and, dip_lgd_weight=Weight associated with DLGD defect type.

$$SD\ Score = sd\_weight$$

where,
SD Score=Total score assigned to a pixel from SD classification and, sd_weight=Weight associated with SD defect type.

$$Group\ Score = grp\_weight$$

where,
Group Score=Total score assigned to a pixel from Group classification and, grp_weight=Weight associated with Group defect type.

$$Disc\ Score = disc\_weight$$

where,
Disc Score=Total score assigned to a pixel from Discontinuity classification and, disc_weight=Weight associated with Disc defect type.

$$ALGD\ Score = aux\_lgd\_wgt$$

where,
Group Score=Total score assigned to a pixel from Group Classification and, aux_lgd_wgt=Weight associated ALGD defect type.

As described above, after pixel level judgments are made and defective pixels are placed into defect groups (which includes: merging overlapping defects, grouping defects that are proximate to one another, and grouping defects located in the same angular displacement on both the inner and outer edges) a Defect Group Severity Score is calculated. This Defect Group Severity Score shows the total severity score assigned to any given defect group and is calculated by the following equation:

$$\text{"Defect Group" Severity Score} = \sum_\Omega RD \text{ Score} + \sum_\Omega LGD \text{ Score} + \sum_\Omega DLGD \text{ Score} + \sum_\Omega SD \text{ Score} + \sum_\Omega \text{Disc Score} + \sum_\Omega \text{Group Score} + \sum_\Omega ALGD \text{ Score}$$

where,

"Defect Group" Severity Score=Total score assigned to a "defect group" from all the defective pixels found with in the group and, $\Omega$=Summation range to include all pixels found in a given "defect Group".

After the above calculations are made, severity scores from each of the defect groups are weighted by an operator-definable parabolic function. The parabolic function gives larger defects a proportionally larger severity score. For example, a defect that is twice as large as two smaller defects will end up with a severity larger than the sum of the two smaller defects.

The weighting function is described by the following equation:

Weighted "Defect Group"

$$\text{Severity Score} = a\_coeff*(\text{"Defect Group" Severity Score})^2 + b\_coeff*(\text{"Defect Group" Severity Score})$$

where, a_coeff=an operator accessible parameter that defines the parabolic weighting function b_coeff=an operator accessible parameter that defines the parabolic weighting function The resulting weighted score is then scaled so that it falls within a range from 0 through 999. The scale factor is determined from the following equation:

Scale Factor=999.0/max. weighted score where,

Max Weighted Score=a_coeff*(max_score)$^2$+b_coeff(max_score)

where,

Max_score=an operator definable parameter determine empirically

Defect group resulting in scores greater than 999 are truncated. Summation of all the defect group scores is the final score for a given lens. If the score turns out to be greater than or equal to a threshold (accessible as an operator parameter) then the lens is rejected. Otherwise, the lens is accepted.

Although the end result of the lens score is either to pass or fail the lens, all of the intermediate data, calculations and scores are available to provide information regarding lens quality and the types of characteristics that are observed on the lens.

It is clear to one skilled in the art that this information may be given on a lens by lens basis, as statistical information, or as a visual output on a computer monitor.

The above algorithm was implemented on the above described apparatus and ophthalmic lenses were inspected.

These lenses were production Johnson & Johnson Vision Products Acuvue™ Soft Hydrogel Contact Lenses consisting of 58% water. One hundred twenty-eight lenses were involved in the first test.

First the lenses were inspected by experienced production line lens inspectors while in deionized water using an image magnification system. Each lens was classified by the inspector as pass or fail and the type of defect was identified for each failure.

When the lenses were inspected by the automated inspection system as described herein, each lens was manually centered in the inspection package to obviate any illumination problems.

After the automated inspection system took images of all 128 lenses, 25 scoring variances were identified with the human inspectors. The results of the comparison between machine-inspected and human-inspected lenses is given in table 1.

TABLE 1

| Summary of Machine vs. Human Inspection #1 | | |
|---|---|---|
| Total Lenses | Number 128 | Percent 100.0 |
| Agree | 103 | 80.4 |
| Disagree | 25 | 19.5 |
| Machine Negatives: | | |
| Due to illumination | 7 | 5.5 |
| not seen by Human | 5 | 3.9 |
| Total Machine Negative | 12 | 9.4 |
| Machine Positive: | | |
| due to illumination | 6 | 4.7 |
| defects washed off | 4 | 3.1 |
| small defects not seen by the machine | 3 | 2.3 |
| Total Machine Positive | 13 | 10.1 |

Although the results imply that the machine inspection was incorrect 19.5% of the time there was 12 cases (9.4%) where the machine was overly critical and failed a lens that a human inspector had passed. That is a machine negative. There were also 13 cases (10.1%) where the machine was too positive and passed a lens the human inspector indicated was bad (a machine positive).

In the case of the machine positive, it appeared that the illumination of the lens in the machine inspected system was inadequately adjusted and could be rectified. In the machine negatives, it appeared that the machine parameter settings were to sensitive and needed to be adjusted. Not one large defect, however, escaped detection and most of the defects missed were borderline size, under fifty microns. Not a single half lens or missing lens escaped detection.

Of the twelve machine negatives, seven images had weak edges due to illumination trouble and in five cases real defects appeared which were not seen by the human inspector, but were seen both by the machine and a second human inspector. Of the thirteen machine positives four lenses no longer had defects or may have been caused by extraneous matter that washed off. Six images had weak edges due to illumination troubles and three lenses had defects that were too small to be seen by a human inspector.

Thus, out of the 128 lenses tested, roughly 20% were inconsistent with human inspection. Of those errors, 56% were attributed to illumination, 36% human inspector error or changes in the lens condition through handling and 12% were incorrect decisions. This 12% correspond to only 2.3% improper decisions overall.

Because the majority of inconsistent decisions were due to illumination problems, an investigation was made and it was determined that nonuniformity in the light source and, in particular, over illumination, caused the lens edge to be washed out and defects not to be visible.

Another reason for an inconsistent result between the human and machine inspection was the lens not having been agitated either during human inspection or machine inspection, with a distinction between particles in the water and defects on the lens not readily apparent.

Illumination of the lens was improved by providing a more uniform and diffuse illumination source. After the illumination improvements, the machine inspected 128 additional lenses. In this inspection protocol, two images were taken on the machine for each lens and compared to an inspection report from a human inspector. The results of this inspection by the machine and the human is given in Table 2.

TABLE 2

Summary of Machine vs. Human Inspection #2

|  | Number | Percent |
|---|---|---|
| Total Lenses | 128 | 100.0 |
| Correct | 98 | 76.6 |
| Incorrect | 30 | 23.4 |
| Machine Negatives: | | |
| Unfocused Image | 10 | 7.8 |
| Due to illumination | 5 | 3.9 |
| Dirt on Lens | 3 | 2.3 |
| Lens Contaminated | 1 | 0.8 |
| Discontinuity | 1 | 0.8 |
| Unknown | 2 | 1.6 |
| Total False Negative | 22 | 17.2 |
| Without Unfocused | 12 | 9.4 |
| Machine Positives: | | |
| due to illumination | 0 | 0.0 |
| small defects | 7 | 5.5 |
| defects washed off | 1 | 0.8 |
| Total False Positive | 8 | 6.3 |

As can be observed from the data given in table 2, a new category of negatives, "unfocused image", was observed. This was traced to the lens being improperly placed under the camera resulting in a portion of the lens being out of focus. As a measure of system performance, an unfocused image in not indicative of reliability, but is a form of operator error and those data points are properly excluded.

Without the mistaken placement of the lens causing the focus problem, the fraction of lenses where the human inspector and machine disagreed is only 15.6%. This is a 3.9% improvement over the first 128 lenses.

In a third comparative experimental run, 192 lenses were inspected by a human and then were imaged twice by the machine. The results were similar to the previous experimental runs. Out of a total of 384 images, 317 scores, 82.6%, were consistent with the human inspection. As a measure of consistency in the processing algorithm and the resulting lens score, both images taken by the machine were processed by the algorithm and in 84% of the cases the numerical score in the second run was identical to that of the first.

Although the inspection system is designed primarily to inspect the lens edge, missing lenses were properly found because of the search vectors employed in locating the lens edge. Because the lens edge search routine is performed a plurality of times, lenses with holes were detected, extra pieces were found and lenses with edge tears were found.

In the following Table 3 the results for the third inspection are given broken into machine negatives, machine positives and correct scores. Only 8.1% of the machines inspections were false negatives and 9.4% were false positive.

TABLE 3

| Tray | Machine Negatives | Machine Positive | Total Unmatched | Total Correct | Percent Correct |
|---|---|---|---|---|---|
| 1 | 7 | 9 | 16 | 48 | 75 |
| 2 | 9 | 11 | 20 | 44 | 69 |
| 3 | 2 | 4 | 6 | 58 | 91 |
| 4 | 8 | 3 | 11 | 53 | 83 |
| 5 | 4 | 2 | 6 | 58 | 91 |
| 6 | 1 | 7 | 8 | 56 | 88 |
| TOTAL | 31 | 36 | 67 | 317 | 83 |

Results of the first two trays were worse than the following four because the water was found to have picked up dust contaminates. And therefore is not indicative of system performance.

In all, the human inspector and the machine agreed 317 times and disagreed 67 times. Considering consistent and machine negative decisions are acceptable from an inspection viewpoint, the lens disposition was accurate 90.6% of the time.

We claim:

1. A method for inspecting an ophthalmic lens comprising:

capturing an image of the lens for at least one electromagnetic frequency, the image divided into a group of pixels, each pixel representing a portion of the lens;

converting the intensity value of the pixels into related electrical signals;

assigning a position value and an image intensity value;

comparing position values and image intensity values among pixels to establish a pixel relationship;

identifying from the pixel relationship, sets of pixels corresponding to at least three of the following features of the lens: radial deviation and spatial derivative of the position values localized gradient deviation, dip localized gradient deviation, and one-tail localized gradient deviation of the intensity values, and discontinuity; and comparing the features identified from the pixel relationship in said set to a preestablished relationship to ascertain if a lens is acceptable.

2. The method of claim 1 wherein the comparison between pixels is performed along a path following the contour of the lens edge.

3. The method of claim 1 wherein the identification of features comprises collecting pixels sharing a feature characteristic to form a set of pixels.

4. The method of claim 1 wherein the comparison is among a set of pixels comprising the lens edge.

5. The method of claim 1 wherein the comparison is among a set of pixels comprising a portion of the lens interior.

6. The method of claim 2 wherein the lens edge is first located by starting at a point proximate the center of the group of pixels and proceeding toward the boundary of the group of pixels until a pixel having an intensity value characteristic of a lens edge is located.

7. The method of claim 6 wherein additional pixels proximate the pixel having an intensity value characteristic of a lens edge the contour of a set of connected pixels having an intensity value characteristic of a lens edge is followed to determine if the contour is that of a lens edge.

8. The method of claim 4 wherein a processing annulus is set about the lens edge to limit the number of pixels processed to those proximate the lens edge.

9. The method of claim 4 wherein the set of pixels comprising the lens edge is further divided into two subsets of pixels for performing said comparison, a subset of pixels comprising the transition from the lens interior to the lens edge and a subset of pixels comprising the transition from the region exterior the lens to the lens edge.

10. The method of claim 9 wherein said comparison is performed among pixels from the subset of pixels comprising the transition from the lens interior to the lens edge.

11. The method of claim 9 wherein said comparison is performed among pixels from the subset of pixels comprising the transition from the region exterior the lens to the lens edge.

12. The method of claim 9 wherein said comparison is performed between pixels from the subset of pixels comprising the transition from the lens interior to the lens edge and the subset of pixels comprising the transition from the region exterior the lens to the lens edge.

13. The method of claim 4 wherein said relationship compared is a discontinuity in the pixels forming the lens edge.

14. The method of claim 4 wherein said relationship compared is a gradient deviation in the intensity of the pixels forming the lens edge.

15. The method of claim 4 wherein said relationship compared is a radial deviation in the location of the pixels forming the lens edge.

16. The method of claim 4 wherein said relationship compared is a spatial derivative in the location of the pixels forming the lens edge.

17. A method of inspecting an ophthalmic lens comprising:
    capturing an image of the ophthalmic lens at least one electromagnetic frequency, said image consisting of pixels,
    converting the image into a set of electrical values for each pixel,
    choosing a starting pixel as the pixel-of-interest within the image,
    A) determining if the pixel-of-interest has a feature characteristic,
    B) for a pixel-of-interest having no feature characteristics:
        1) changing the pixel-of-interest to another pixel along a path traversing the lens edge, and
        2) repeating procedure A),
    C) for a pixel-of-interest having feature characteristic:
        3) comparing the electronic value of the pixel-of-interest to the electronic values of adjacent pixels,
        4) changing the pixel-of-interest to the adjacent pixel with the best correlation to the feature characteristic,
        5) repeating steps 3) and 4) until the pixel-of-interest represents completion of the feature, said feature being one of a radial deviation, a spatial derivative, a localized gradient deviation, a dip localized gradient deviation, a one-tail localized gradient deviation, and a discontinuity of the lens,
        6) determining if the set of pixels gathered from procedure C) represents a lens edge,
    D) for those sets of pixels that do not represent a lens edge, repeating procedure B), and
    E) for those sets of pixels that represent a lens edge, comparing the relationship between the set of pixels to predetermined relationships to determine if the lens is acceptable.

18. The method of claim 17 wherein the electrical value comprises location and image intensity.

19. The method of claim 17 wherein the starting pixel is located proximate the center of the lens and the path traversing lens edge is along a ray extending from the center of the lens.

20. The method of claim 19 further comprising in procedure D) the step of comparing the set of pixels that do not represent a lens edge to a predetermined relationship to determine if the lens is acceptable.

21. The method of claim 18 wherein the feature characteristic is a change in image intensity.

22. The method of claim 19 wherein the approximate center of the lens is determined by taking at least one set of at least three points having an edge characteristic.

23. The method of claim 17 wherein the electrical value comprises location and image intensity gradient.

24. The method of claim 23 wherein the feature characteristic is an absolute value of an image intensity gradient.

25. An apparatus for the inspection an ophthalmic lens comprising:
    a light source for illuminating a lens;
    a camera placed to capture an image of the lens provided by the light source, the camera comprising a receptor wherein the image consists of a plurality of pixels;
    means for converting the light striking the receptor at each pixel to an electrical value related to the intensity of light striking that pixel;
    means for storing the electrical intensity value associated with each pixel in memory along with a value associated with the location on the receptor field;
    a digital computer operably connected to the memory storing the electrical intensity values and location values, and capable of retrieving those values, the computer containing instructions for comparing intensity and location values among pixels to identify features of the lens comprised of sets of pixels, said features being at least three of the following features: radial deviation and spatial derivative of the position values, localized gradient deviation, dip localized gradient deviation, and one-tail localized gradient deviation of the intensity values, and discontinuity of the lens, and the computer containing further instructions as to those features that render the lens unacceptable.

26. A method for automatically inspecting an ophthalmic lens, comprising the steps of:
    collecting data to establish a plurality of edge triplet pixels in a number of groups, each of the number of groups defining a circle having a circle center;
    obtaining an average circle center from the number of circle centers;
    generating a processing annulus which contains the lens edge;
    enhancing the lens edge to provide lens inner and outer transition edges;
    tracking the inner and outer transition edges to extract the lens edge;
    bridging discontinuities in the inner and outer transition edges that are below a predetermined number of pixels;
    extracting at least three of features of the lens;
    classifying as defects the extracted features that are different from corresponding thresholds.

27. The method of claim 26 further comprising declaring the lens defective when the defects are different from predetermined criteria.

28. The method of claim 26 further comprising the steps of:
assigning scores to each of the defective features in proportion to a severity of the defects of the extracted features;
grouping defective pixels associated with said defective features into defect groups based on an angular displacement among the defective pixels to determine if said defective pixels are part of a larger defect;
combining defect groups that meet a predetermined relationship to form larger defect groups;
weighing the scores of the defect groups according to impact on the quality of the lens;
adding the weighted scores to determine a total severity score; and
discarding the lens if the total severity score exceeds a predetermined number.

29. The method of claim 26, the extracting step extracts at least three lens features, said lens features including:
radial deviation from the inner and outer transition edges;
localized gradient deviation of an intensity value of a pixel with respect to pixels adjacent thereto;
spatial derivative that allows detection of a change in radius verses a change in angular displacement that is sharper than a change indicated by the radial deviation;
discontinuity that is not correctable by the bridging step;
dip localized gradient deviation that is sensitive to a gradient deviation of a pixel that is less than gradient deviations of neighboring pixels to allow identification of edge defects that are smaller that edge defects detected by the localized gradient deviation; and
one-tail localized gradient deviation that determines both negative and positive gradient deviations on one side of a pixel.

30. The method of claim 26, wherein the enhancing step performs the edge enhancement using pixels contained in the processing annulus.

31. The method of claim 26, prior to the collecting step, further comprising correcting a digital image of a container for holding the lens for known defective pixels in an imaging device.

32. The method of claim 31, wherein the correcting step includes interpolating between adjacent pixels of a uniform target image.

33. The method of claim 26, prior to the collecting step, further comprising locating the lens in a digital image by identifying an edge of the lens.

34. The method of claim 33, wherein the locating step performs a pixel to pixel search along a radial direction from an inner portion of the lens toward the edge.

35. The method of claim 33, wherein the locating step includes the steps of:
determining that an object is encountered upon detection of a pixel having a different intensity than an adjoining pixel;
tracking a contour of the object; and
determining that the edge is encountered if a curvature of the contour matched an expected curvature of the lens edge.

36. The method of claim 35, wherein the edge encounter determining step determines a count of pixels that form the contour and compares the count with a predetermined count.

37. The method of claim 33, after the locating step, further comprising determining whether the lens is absent from the container.

38. The method of claim 26, after the obtaining step, further comprising discarding a circle center with a greatest distance from the average circle center.

39. The method of claim 26, after the enhancing step, further comprising the steps of performing a skeletonization operation to reduce a width of the inner and outer transition edges to a single pixel; and applying a thresholding operator to eliminate pixels not needed in the extracting step.

40. The method of claim 26, wherein the tracking step begins by searching from an inner boundary of the processing annulus outward.

41. The method of claim 26, wherein the bridging step bridges by extrapolation when the discontinuities are less than a predetermined size, and bridges by jumping when the discontinuities are greater than the predetermined size.

42. The method of claim 41, further comprising identifying as a defective feature the discontinuities that are bridged by jumping.

43. The method of claim 26, after the bridging step, further comprising transforming positional data from rectangular coordinates to polar coordinates.

44. The method of claim 26, wherein the classifying step includes comparing each of the extracted features to the corresponding thresholds.

* * * * *